(12) United States Patent  
Asao et al.

(10) Patent No.: US 6,700,239 B2
(45) Date of Patent: Mar. 2, 2004

(54) AUTOMOTIVE ALTERNATOR

(75) Inventors: Yoshihito Asao, Tokyo (JP); Katsumi Adachi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/769,408

(22) Filed: Jan. 26, 2001

(65) Prior Publication Data

US 2001/0026102 A1 Oct. 4, 2001

(30) Foreign Application Priority Data

Mar. 30, 2000 (JP) ........................................ 2000-094377

(51) Int. Cl.$^7$ ................................................ H02K 9/00
(52) U.S. Cl. ......................................... 310/59; 310/58
(58) Field of Search ........................... 310/59, 61, 62, 310/63, 179, 201

(56) References Cited

U.S. PATENT DOCUMENTS

| | | | |
|---|---|---|---|
| 4,488,070 A | * 12/1984 | Iwaki et al. | 310/62 |
| 4,492,885 A | 1/1985 | Kitamura et al. | 310/62 |
| 4,757,221 A | 7/1988 | Kurihashi et al. | 310/62 |
| 5,235,229 A | * 8/1993 | Tanaka et al. | 310/62 |
| 5,329,199 A | 7/1994 | Yockey et al. | 310/263 |
| 5,561,334 A | * 10/1996 | Ishida et al. | 310/263 |
| 5,977,668 A | 11/1999 | Yoshioka | 310/62 |
| 6,011,332 A | * 1/2000 | Umeda et al. | 310/201 |
| 6,140,735 A | * 10/2000 | Kato et al. | 310/201 |

FOREIGN PATENT DOCUMENTS

| | | |
|---|---|---|
| EP | A 0 671 801 | 9/1995 |
| EP | A 0 671 803 | 9/1995 |
| EP | A 0 762 615 | 3/1997 |
| EP | A 09 172 752 | 6/1997 |
| EP | A 0 881 747 | 12/1998 |
| EP | A 0 881 748 | 12/1998 |
| EP | A 0 881 749 | 12/1998 |
| EP | A 0 917 278 | 5/1999 |
| FR | A 2 746 227 | 9/1997 |
| JP | H-4-26345 | 1/1999 |
| JP | 11-74537 | 3/1999 |
| JP | A-11-155270 | 6/1999 |
| JP | DEA-199-22-794 | 11/1999 |

* cited by examiner

Primary Examiner—Karl Tamai
Assistant Examiner—Nguyen Hanh
(74) Attorney, Agent, or Firm—Sughrue Mion, PLLC

(57) ABSTRACT

An alternator includes a rear-end fan which is constructed so as to have greater capacity than a front-end fan. The construction is such that a flow rate in a front-end ventilation pathway in which a cooling air flow enters through front-end air intake apertures is deflected centrifugally by the front-end fan and is then expelled through front-end air discharge apertures is greater than a flow rate in a rear-end ventilation pathway in which a cooling air flow enters through rear-end air intake apertures is deflected centrifugally by the rear-end fan and is then expelled through rear-end air discharge apertures.

19 Claims, 18 Drawing Sheets

AUTOMOTIVE ALTERNATOR

BACKGROUND OF THE INVENTION

1. Field of the Invention

The present invention relates to an automotive alternator provided with a blowing means.

The entire content of the basic Japanese Patent Application from which the priority under the Convention is claimed in this application is hereby incorporated by reference into this application.

2. Description of the Related Art

FIG. 25 is a cross section of a conventional automotive alternator, and FIGS. 26 and 27 are front elevations showing a front-end fan and a rear-end fan, respectively, used in a rotor of the conventional automotive alternator.

This automotive alternator is constructed by rotatably mounting a Lundell-type rotor 7 by means of a shaft 6 inside a case 3 constructed from an aluminum front bracket 1 and an aluminum rear bracket 2, and fastening a stator 8 to an inner wall of the case 3 so as to cover an outer circumferential side of the rotor 7.

The shaft 6 is rotatably supported in the front bracket 1 and the rear bracket 2. A pulley 4 is fastened to a first end of this shaft 6 such that rotational torque from an engine can be transmitted to the shaft 6 by means of a belt (not shown).

Slip rings 9 for supplying electric current to the rotor 7 are fastened to a second end of the shaft 6, and a pair of brushes 10 are housed in a brush holder 11 disposed inside the case 3 such that the pair of brushes 10 slide in contact with the slip rings 9. A regulator 18 for adjusting the magnitude of alternating voltage generated in the stator 8 is fastened by adhesive to a heat sink 17 fitted onto the brush holder 11. A rectifier 12 which is electrically connected to the stator 8 and converts alternating current generated in the stator 8 into direct current is mounted inside the case 3.

The rotor 7 is composed of a rotor coil 13 for generating magnetic flux on passage of electric current, and a pair of Lundell-type front-end and rear-end pole cores 20 and 21 disposed so as to cover the rotor coil 13, magnetic poles being formed in the front-end and rear-end pole cores 20 and 21 by magnetic flux generated in the rotor coil 13. The pair of front-end and rear-end pole cores 20 and 21 are made of iron, each has a number of front-end and rear-end claw-shaped magnetic poles 22 and 23 disposed on an outer circumferential perimeter at even pitch in a circumferential direction so as to project axially, and the front-end and rear-end pole cores 20 and 21 are fastened to the shaft 6 facing each other such that the front-end and rear-end claw-shaped magnetic poles 22 and 23 intermesh.

The front-end and rear-end fans 5A and 5B are each prepared by form-working a metal plate, and each includes an annular fan base portion 5a, a number of blade base plates 5b extending radially outwards from outer peripheral portions of the fan base portions 5a, and blades 5c formed by folding and bending an outer peripheral portion of each of the blade base plates 5b. The front-end and rear-end fans 5A and 5B are fastened to front and rear axial ends of the front-end and rear-end pole cores 20 and 21, respectively.

The stator 8 is constituted by a stator core 15, and a stator coil 16 formed by winding a conducting wire into this stator core 15, alternating current being generated in the stator coil 16 by changes in magnetic flux from the rotor 7 accompanying rotation of the rotor 7. Portions of the stator coil 16 extend from front and rear axial ends of the stator core 15 and constitute a front-end coil end group 16f and a rear-end coil end group 16r.

In automotive alternators constructed in this manner, electric current is supplied from a battery (not shown) through the brushes 10 and the slip rings 9 to the rotor coil 13, generating magnetic flux. The front-end claw-shaped magnetic poles 22 in the front-end pole core 20 are magnetized with north-seeking (N) poles by this magnetic flux, and the rear-end claw-shaped magnetic poles 23 in the rear-end pole core 21 are magnetized with south-seeking (S) poles. At the same time, rotational torque from the engine is transmitted through the belt and the pulley 4 to the shaft 6, rotating the rotor 7. Thus, a rotating magnetic field is applied to the stator coil 16, generating electromotive force in the stator coil 16. This alternating electromotive force passes through the rectifier 12 and is rectified into direct current, the output thereof is adjusted by the regulator 18, and the battery is recharged.

In this automotive alternator, the rotor coil 13, the stator coil 16, the rectifier 12, and the regulator 18 continuously generate heat during power generation, and in an alternator having a rated output current in the 100A class, these components generate 60W, 500W, 120W, and 6W of heat energy, respectively, at rotational frequencies at which the temperature is high.

Thus, in order to cool the heat generated by power generation, front-end and rear-end air intake apertures 1a and 2a and front-end and rear-end air discharge apertures 1b and 2b are disposed in the front bracket 1 and the rear bracket 2. More specifically, as shown in FIG. 25, a number of the front-end and rear-end air intake apertures 1a and 2a are disposed in lines circumferentially in axial surfaces (end surfaces) of the front bracket 1 and the rear bracket 2, respectively, and a number of the front-end and rear-end air discharge apertures 1b and 2b are disposed in lines circumferentially in radial surfaces (side surfaces) of the front bracket 1 and the rear bracket 2, respectively.

At the rear end, as indicated by arrows in FIG. 25, external air is sucked into the case 3 through the rear-end air intake apertures 2a by rotation of the rear-end fans 5B, cooling the rectifier 12 and the regulator 18, and is then deflected centrifugally by the rear-end fans 5B, cooling the rear-end coil end group 16r of the stator coil 16 before being expelled to the outside through the rear-end air discharge apertures 2b. At the same time, at the front end, as indicated by arrows in FIG. 25, external air is sucked into the case 3 through the front-end air intake apertures 1a by rotation of the front-end fans 5A and is then deflected centrifugally by the front-end fans 5A, cooling the front-end coil end group 16f of the stator coil 16 before being expelled to the outside through the front-end air discharge apertures 1b. In addition, a cooling air flow flows from the front end to the rear end as a result of a pressure difference between the front end and the rear end, cooling the rotor coil 13.

When the conventional automotive alternator constructed in this manner is operated at a rotational frequency of 5000 rpm, the air flow rate in each of the ventilation pathways has been such that the front-end intake air flow rate $Qf_{IN}$ was 0.025 m$^3$/s, the front-end discharge air flow rate $Qf_{OUT}$ was 0.02 m$^3$/s, the rear-end intake air flow rate $Qr_{IN}$ was 0.03 m$^3$/s, the rear-end discharge air flow rate $Qr_{OUT}$ was 0.035 m$^3$/s, and the front-to-rear air flow rate $Q_{f \to r}$ was 0.005 m$^3$/s.

This conventional automotive alternator is constructed such that the rear-end flow rates are greater than the front-end flow rates. Thus, at the rear end, because the large volume of cooling air taken in through the rear-end air intake apertures 2*a* is warmed as it cools the rectifier 12 and the regulator 18 and is then supplied for the cooling of the rear-end coil end group 16*r* of the stator coil 16, temperature increases in the rear-end coil end group 16*r* cannot be sufficiently suppressed. Similarly, at the front end, because the small volume of cooling air taken in through the front-end air intake apertures 1*a* is supplied for the cooling of the front-end coil end group 16*f* of the stator coil 16, temperature increases in the front-end coil end group 16*f* cannot be sufficiently suppressed. In other words, one problem has been that overall cooling efficiency has been low because the front-end flow rates have been too low to effectively cool the stator coil 16.

Now, fan-generated noise (SPL: Sound Pressure Level) is expressed by SPL=k+10 log($P^{2.5} \times Q$), and is significantly affected by pressure loss P and by flow rate Q at the work point. Moreover, k is the specific sound level, being the noise per unit pressure and flow rate.

The relationship between pressure loss (P), flow rate (Q), and wind resistance (r) is generally expressed by $P = r \times Q^2$.

Thus, in the case of an identical flow rate, pressure loss becomes increasingly excessive as wind resistance increases, causing SPL to worsen significantly.

Consequently, another problem in conventional automotive alternators has been that noise is increased because the flow rates in the rear end where the wind resistance is higher are greater than in the front end, as mentioned above.

SUMMARY OF THE INVENTION

The present invention aims to solve the above problems and an object of the present invention is to provide an automotive alternator enabling overall cooling efficiency to be raised by making front-end flow rates capable of effectively cooling coil ends of a stator coil greater than rear-end flow rates so that the stator coil can be cooled sufficiently, and increasing the capacity of a rear-end blowing means relative to the capacity of a front-end blowing means to ensure rear-end flow rates so that a rectifier and a regulator are sufficiently cooled, and in addition, enabling noise to be reduced by making the flow rates in the front end, where wind resistance is small, greater than the flow rates in the rear end, where wind resistance is great.

In order to achieve the above object, according to one aspect of the present invention, there is provided an automotive alternator including:
  a rotor fastened to a shaft rotatably supported by a front bracket and a rear bracket, the rotor having a pair of Lundell-type pole cores disposed inside the brackets;
  a stator supported by the brackets, the stator being disposed so as to cover an outer circumference of the rotor, the stator comprising:
    a cylindrical stator core in which a plurality of slots having grooves lying in an axial direction are disposed circumferentially so as to open onto an inner circumferential side; and
    a stator coil installed in the stator core so as to constitute a predetermined winding construction;
  a pulley fastened to a front end of the shaft; and
  a rectifier disposed at a rear end of the rotor,
  wherein
  a plurality of front-end and rear-end air intake apertures are disposed in axial end surfaces of the front and rear brackets, respectively;
  a plurality of front-end and rear-end air discharge apertures are disposed in radial side surfaces of the front and rear brackets, respectively; and
  front-end and rear-end blowing means are disposed at front and rear axial ends of the rotor, respectively,
    whereby a front-end ventilation pathway in which a cooling air flow flows through the front-end air intake apertures into the front-end bracket and flows out through the front-end air discharge apertures, a rear-end ventilation pathway in which a cooling air flow flows through the rear-end air intake apertures into the rear-end bracket and flows out through the rear-end air discharge apertures, and a front-to-rear ventilation pathway in which a cooling air flow flows through an inner side of the rotor between the front end and the rear end each is generated by operation of the blowing means,
    wherein a capacity of the rear-end blowing means is greater than a capacity of the front-end blowing means, and a front-end air intake flow rate is greater than a rear-end air intake flow rate.

A front-end air discharge flow rate may be greater than a rear-end air discharge flow rate.

According to another aspect of the present invention, there is provided an automotive alternator including:
  a rotor fastened to a shaft rotatably supported by a front bracket and a rear bracket, the rotor having a pair of Lundell-type pole cores disposed inside the brackets;
  a stator supported by the brackets, the stator being disposed so as to cover an outer circumference of the rotor, the stator comprising:
    a cylindrical stator core in which a plurality of slots having grooves lying in an axial direction are disposed circumferentially so as to open onto an inner circumferential side; and
    a stator coil installed in the stator core so as to constitute a predetermined winding construction;
  a pulley fastened to a front end of the shaft; and
  a rectifier disposed at a rear end of the rotor,
  wherein
  a plurality of front-end and rear-end air intake apertures are disposed in axial end surfaces of the front and rear brackets, respectively;
  a plurality of front-end and rear-end air discharge apertures are disposed in radial side surfaces of the front and rear brackets, respectively; and
  front-end and rear-end blowing means are disposed at front and rear axial ends of the rotor, respectively,
    whereby a front-end ventilation pathway in which a cooling air flow flows through the front-end air intake apertures into the front-end bracket and flows out through the front-end air discharge apertures, a rear-end ventilation pathway in which a cooling air flow flows through the rear-end air intake apertures into the rear-end bracket and flows out through the rear-end air discharge apertures, and a front-to-rear ventilation pathway in which a cooling air flow flows through an inner side of the rotor between the front end and the rear end each is generated by operation of the blowing means,
    wherein a capacity of the rear-end blowing means is greater than a capacity of the front-end blowing means, and a front-end air discharge flow rate is greater than a rear-end air discharge flow rate.

The front-to-rear ventilation pathway may be blocked.

The front-end and rear-end blowing means may be the Lundell-type pole cores or fans.

The front-end blowing means may be one of the Lundell-type pole cores and the rear-end blowing means may be a fan.

The front-end and rear-end blowing means may be fans, each fan comprising:
   a generally annular fan base portion;
   a plurality of blade base plates extending radially outwards from outer circumferential edge portions of the fan base portion; and
   a plurality of blades standing on an outer circumferential edge portion of each of the plurality of blade base plates.

The rear-end fan may be provided with a greater number of blades than the front-end fan.

A maximum blade height of the rear-end fan may be greater than a maximum blade height of the front-end fan.

The blade base plates of the rear-end fan may be formed into a shape which blocks valley portions between adjacent magnetic poles of the rotor.

A shielding plate may be disposed for blocking air gaps formed by the blade base plates of the rear-end fan and valley portions between adjacent magnetic poles of the rotor.

The stator coil may be constructed by:
   inserting coil segments composed of short conductors formed into a general U shape from a first end of the stator core into slot pairs in which the slots in each pair are a predetermined number of slots apart; and
   circumferentially bending and joining together free end portions of the coil segments extending outwards at a second end of the stator core from slots the predetermined number of slots apart so as to constitute the predetermined winding construction,
   wherein turn-end coil ends formed by U-shaped turn ends of the coil segments are aligned in rows circumferentially to constitute a turn-end coil end group, and joint-end coil ends formed by the joining of the free end portions of the coil segments are aligned in rows circumferentially to constitute a joint-end coil end group.

The joint-end coil end group of the stator coil may be disposed at the front end of the stator core.

The stator coil may be constructed by linking a plurality of winding sub-portions so as to constitute the predetermined winding construction,
   wherein each of the winding sub-portions is constituted by one strand of wire constituted by a large number of straight portions housed inside the slots and a large number of turn portions linking together end portions adjacent straight portions outside the slots, the strand of wire being installed in the stator core by housing the straight portions so as to form different layers relative to a slot depth direction in slots the predetermined number of slots apart, and coil ends formed by the turn portions are aligned in rows circumferentially to constitute front-end and rear-end coil end groups of the stator coil.

DETAILED DESCRIPTION OF THE PREFERRED EMBODIMENTS

The preferred embodiments of the present invention will now be explained with reference to the drawings.

Embodiment 1

Figure 1:
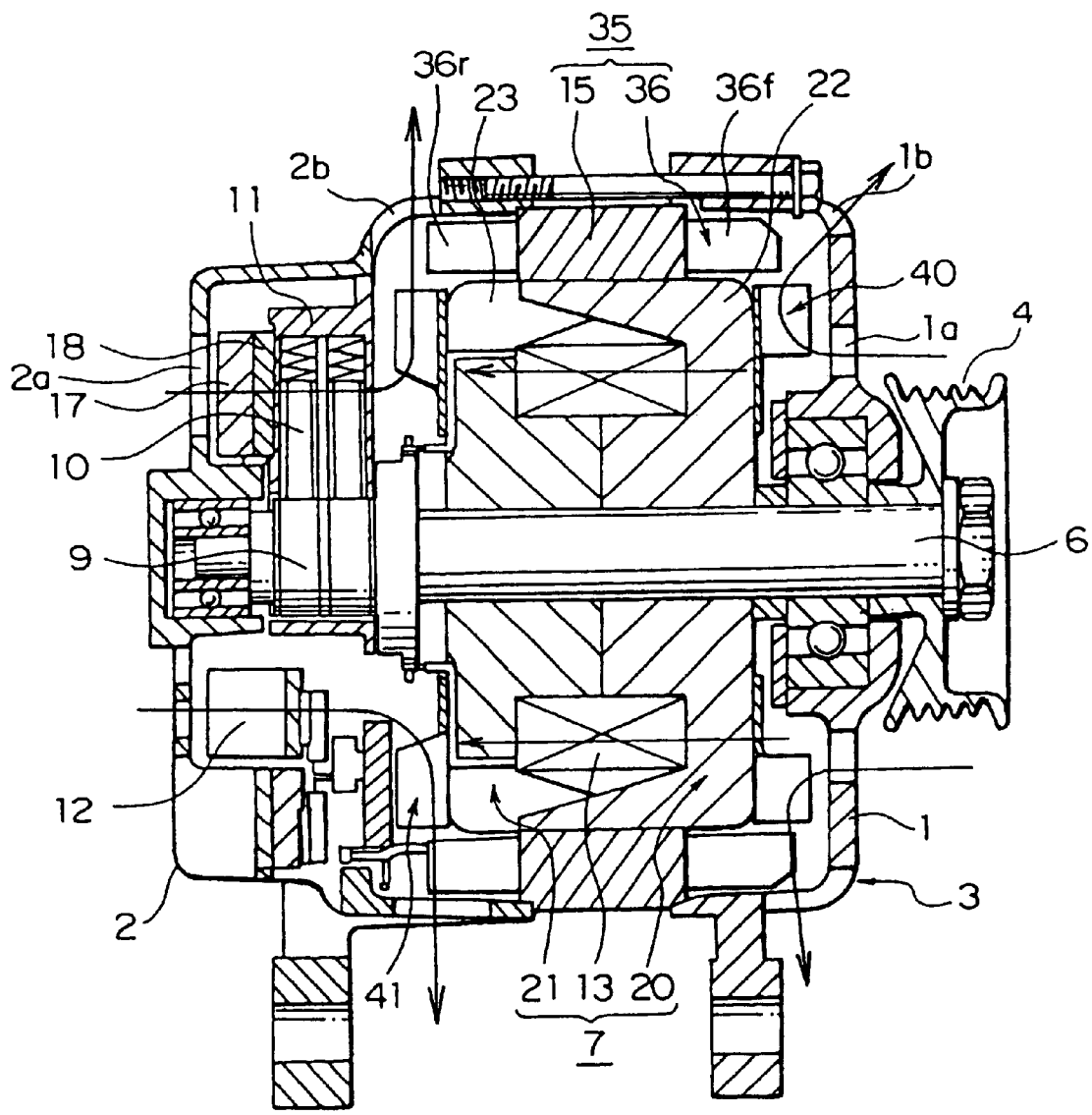
FIG. 1 is a cross section of a construction of an automotive alternator according to Embodiment 1 of the present invention.
Figure 2:
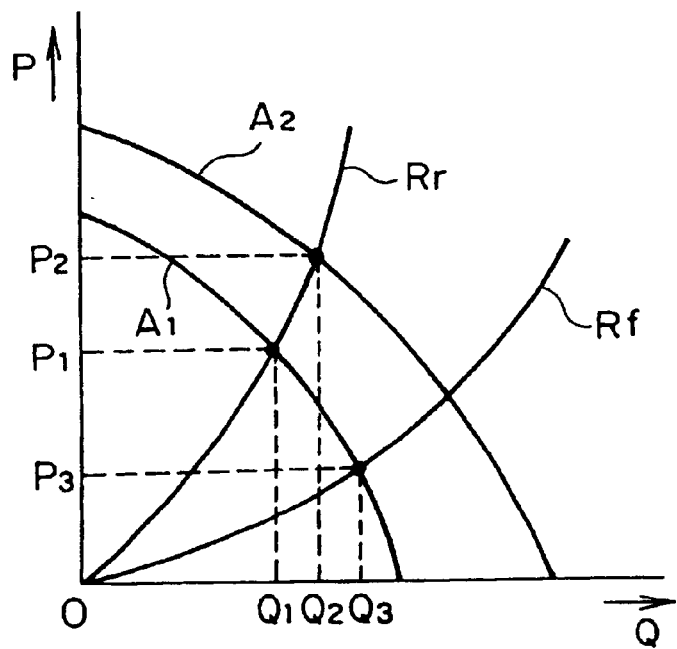
FIG. 2 is a graph of blowing performance of fans used in the automotive alternator according to Embodiment 1 of the present invention.
Figure 3:
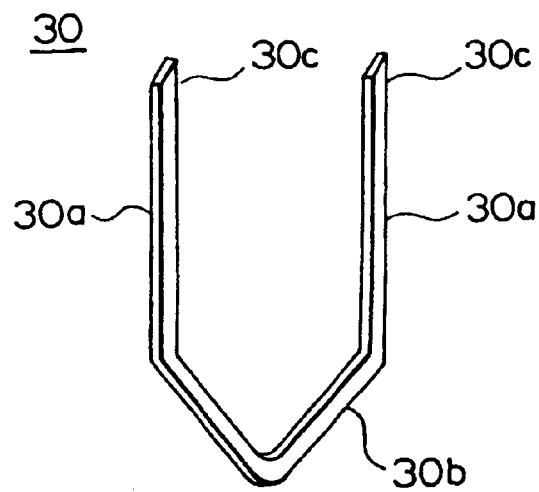
FIG. 3 is a perspective of a coil segment used in a stator of the automotive alternator according to Embodiment 1 of the present invention.
Figure 4:
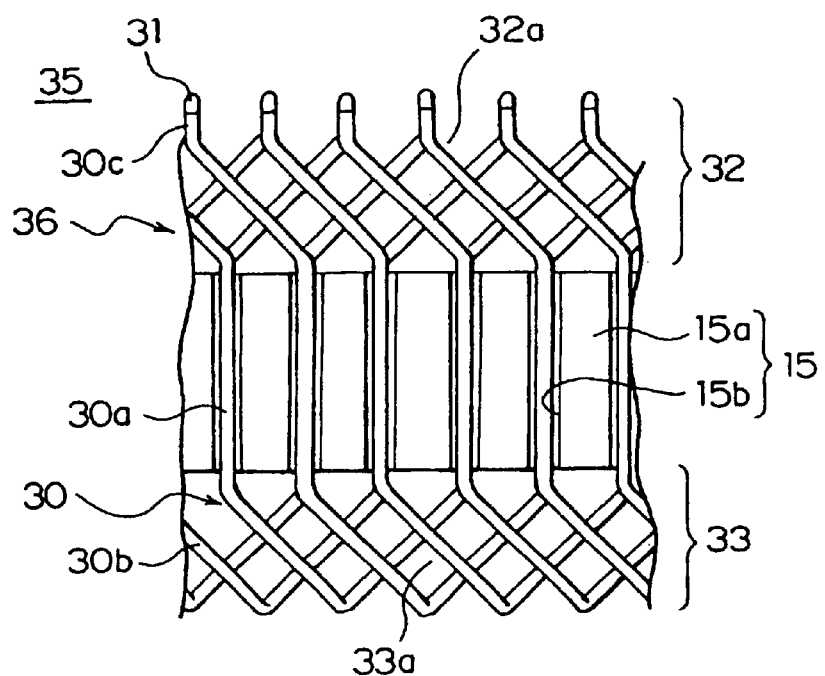
FIG. 4 is a partial side elevation of the stator with the coil segments installed.
Figure 5:
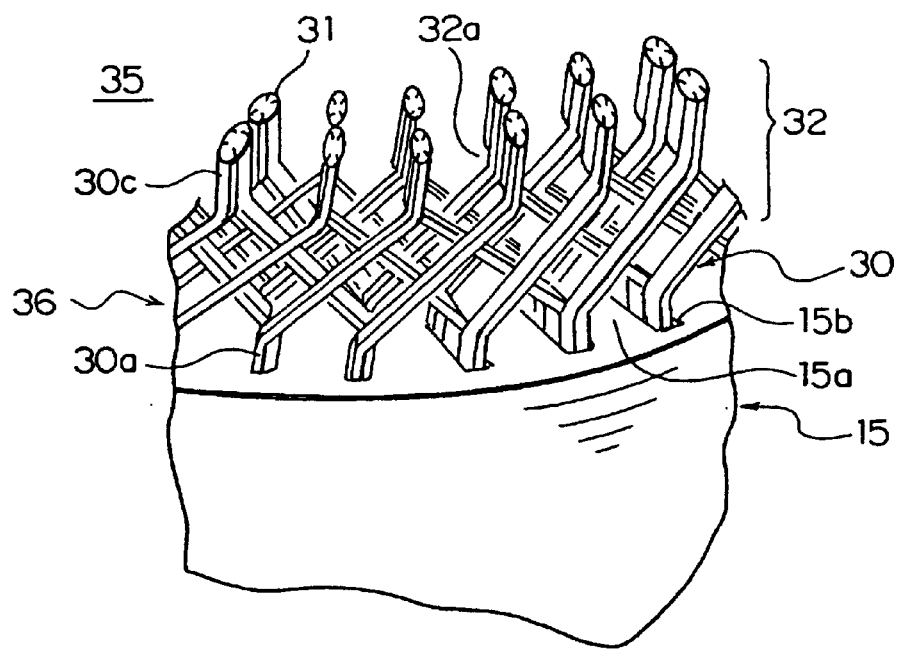
FIG. 5 is a partial perspective of the stator with the coil segments installed.
Figure 25:
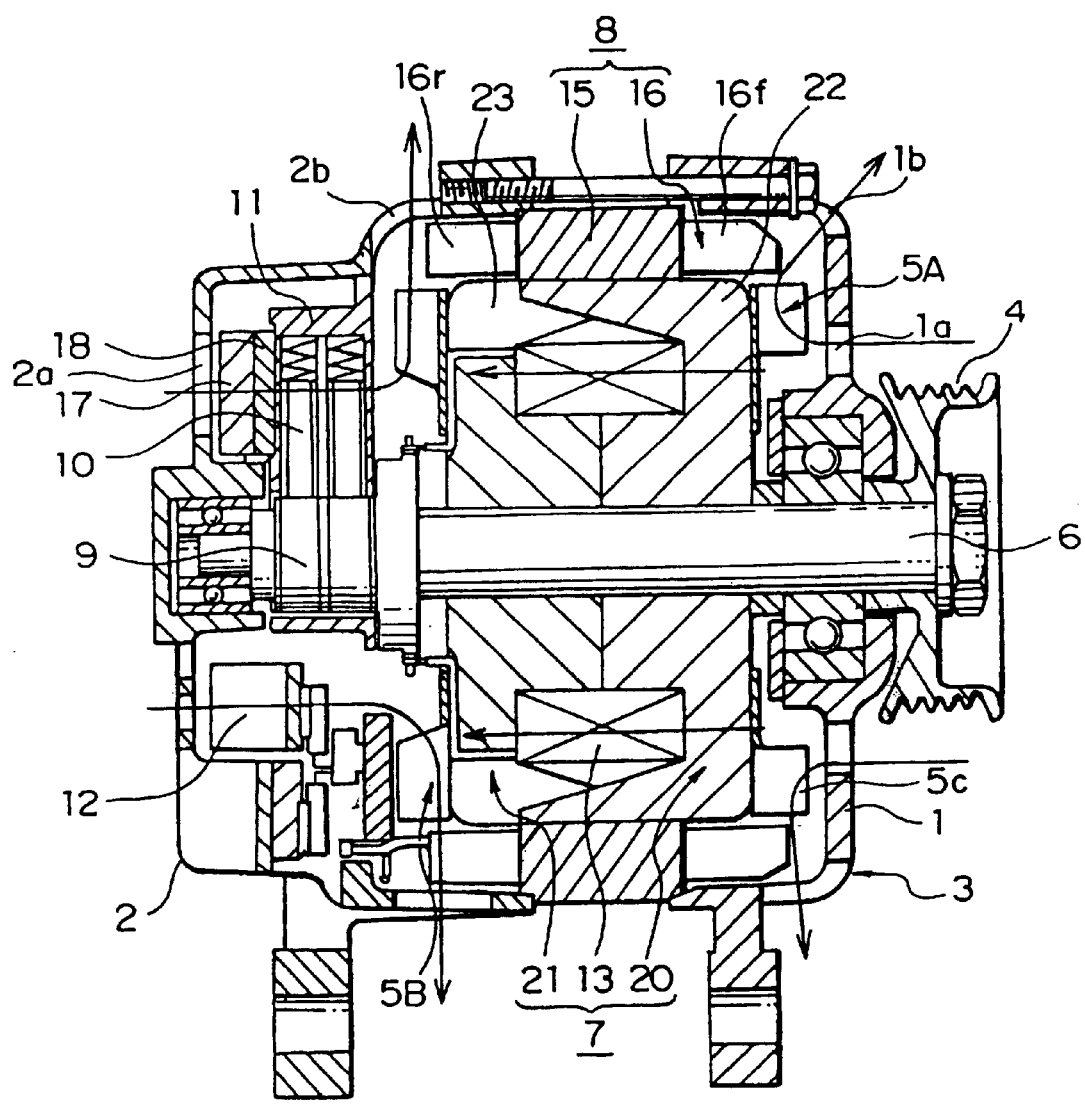
FIG. 25 is a cross section of a construction of a conventional automotive alternator.
Figure 26:
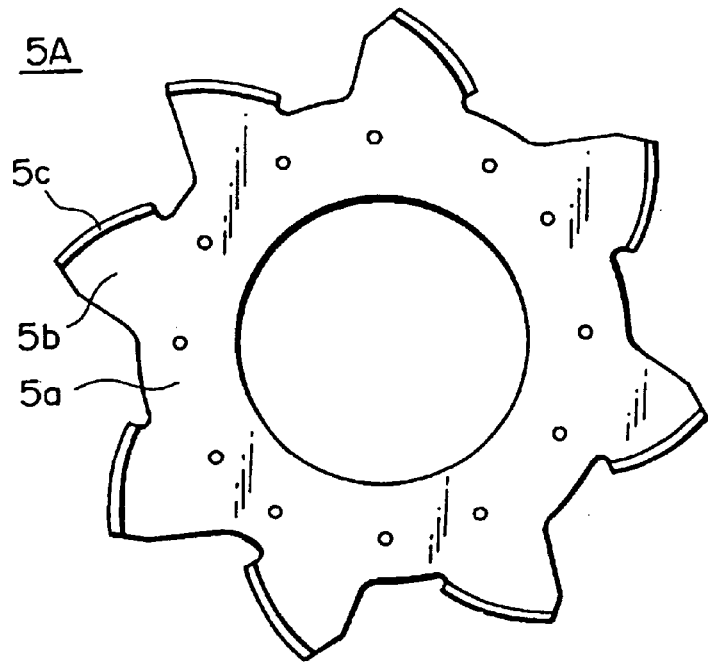
FIG. 26 is a front elevation of a conventional front-end fan.
Figure 27:
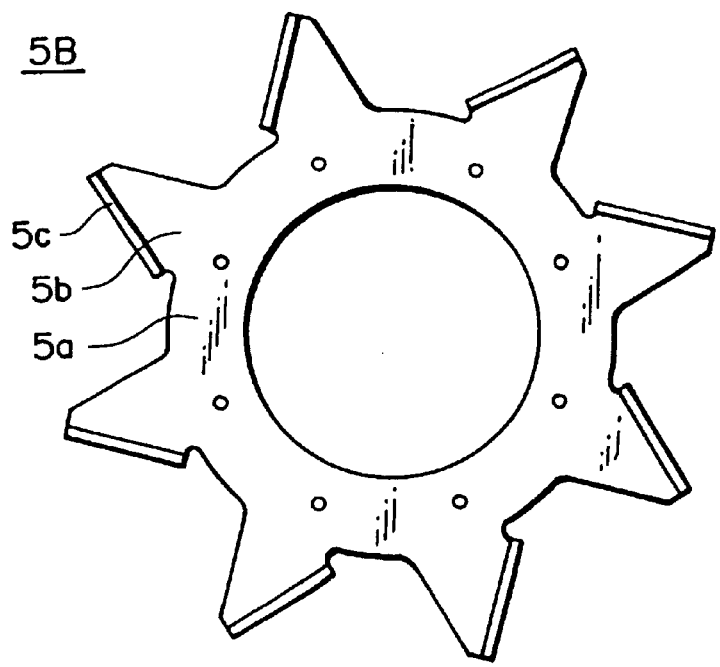
FIG. 27 is a front elevation of a conventional rear-end fan.

FIG. 1 is a cross section of a construction of an automotive alternator according to Embodiment 1 of the present invention, FIG. 2 is a graph of blowing performance of fans used in the automotive alternator according to Embodiment 1 of the present invention, FIG. 3 is a perspective of a U-shaped coil segment constituting a stator coil used in a stator of the automotive alternator according to Embodiment 1 of the present invention, FIG. 4 is a partial side elevation of the stator with the coil segments installed, and FIG. 5 is a partial perspective of the stator with the coil segments installed. Moreover, in each of the figures, portions which are identical or correspond to portions of the conventional automotive alternator shown in FIG. 25 will be given identical numbering and explanation thereof will be omitted.

In each of the figures, a front-end fan 40 functioning as a front-end blowing means is fastened to a front-end surface of the front-end pole core 20 of the rotor 7, and a rear-end fan 41 functioning as a rear-end blowing means is fastened to a rear-end surface of the rear-end pole core 21 of the rotor 7. The front-end fan 40 has a blowing performance indicated by a curve A1 in FIG. 2, and the rear-end fan 41 has a blowing performance indicated by a curve A2 in FIG. 2. In other words the rear-end fan 41 has a greater capacity than the front-end fan 40. Moreover, the capacity of each fan is defined as the magnitude of a pressure difference upstream and downstream from the fan for a predetermined flow rate, capacity being to be considered greater if the resulting pressure difference is greater for an identical flow rate.

A stator 35 is constituted by a stator core 15 and a stator coil 36. The stator coil is formed into a cylindrical shape, a plurality of teeth 15a having a generally rectangular cross-sectional shape are disposed at even angular pitch in a circumferential direction so as to protrude radially inwards, and slots 15b for housing the stator coil 36 are formed between the teeth 15a. Each of the slots 15b has grooves lying parallel to an axial direction, and is open on an inner circumferential side.

The stator coil 36 is constructed by connecting a large number of short coil segments 30 so as to form a predetermined winding construction, for example, a three-phase alternating-current winding construction. A conductor such as copper having a rectangular cross section covered with an electrically-insulating coating is used for the coil segments 30, and each coil segment 30 is formed into a general U shape composed of a pair of straight portions 30a linked by a generally V-shaped turn portion 30b. Furthermore, each of the coil segments 30 is prepared such that the spacing between the pair of straight portions 30a is adjusted in advance to a spacing of three slots. The pairs of straight portions 30a of the coil segments 30 are inserted from the rear end of the stator core 15 into a set of pairs of slots 15b in which the slots in each pair are three slots away from each other, extending portions of the straight portions 30a extending outwards at the front end of the stator core 15 are bent, and then free end portions 30c are joined to each other so as to form one three-phase alternating-current winding overall, for example. Moreover, the set of pairs of slots 15b in which the slots in each pair are three slots away from each other corresponds to a set of slots including a first slot and a fourth slot in a circumferential direction, for example.

Here, these coil segments 30 are inserted two at a time into each of the sets of slots 15b such that a height dimension of the turn portions 30b is aligned as shown in FIG. 4. Four straight portions 30a are housed in each of the slots 15b so as to line up in one row radially with a longitudinal direction of their rectangular cross sections aligned radially.

In each of the sets of slots 15b, a first coil segment 30 is inserted into a first position from an outer circumferential side of a first slot 15b and a second position from the outer circumferential side of a second slot 15b, and a second coil segment 30 is inserted into a third position from the outer circumferential side of the first slot 15b and a fourth position from the outer circumferential side of the second slot 15b. An outer-layer winding is prepared by joining free end portions 30c of the coil segments 30 inserted into the first positions from the outer circumferential side of the slots 15b to free end portions 30c of other coil segments 30 inserted into the second positions from the outer circumferential side of slots 15b three slots away. An inner-layer winding is prepared by joining free end portions 30c of the coil segments 30 inserted into the third positions from the outer circumferential side of the slots 15b to free end portions 30c of other coil segments 30 inserted into the fourth positions from the outer circumferential side of slots 15b three slots away. Then, the outer-layer winding and the inner-layer winding are connected in series.

The free end portions 30c of the coil segments 30 are stacked radially and joined to each other by generally fusing joint portions (tip portions of the free end portions 30c) by arc welding. The two joined free end portions 30c (joint portions 31) in the inner-layer winding and the two joined free end portions 30c (joint portions 31) in the outer-layer winding are lined up in one row radially. Thus, joint-end coil ends 32a constituted by the joint portion 31 ends of the coil segments 30 are arranged in two rows circumferentially to constitute a joint-end coil end group 32.

At this time, the two free end portions 30c being joined are stacked together with the short sides of the rectangular cross sections thereof abutted, and are joined by fusing the whole of the tip portions by arc welding.

Turn-end coil ends 33a formed by the turn portion 30b ends of the coil segments 30 are arranged in two rows circumferentially to constitute a turn-end coil end group 33.

The stator 35 constructed in this manner is installed in an automotive alternator with the joint-end coil end group 32 constructed by joining the free end portions 30c of the coil segments 30 positioned at a front end and the turn-end coil end group 33 constituted by the turn portions 30b positioned at a rear end. In other words, the joint-end coil end group 32 of the stator coil 36 corresponds to a front-end coil end group 36f, and the turn-end coil end group 33 corresponds to a rear-end coil end group 36r.

Next, the work points of the fans 40 and 41 according to Embodiments 1 will be explained with reference to FIG. 2. In FIG. 2, A1 is a blowing performance curve for the front-end fan 40, A2 is a blowing performance curve for the rear-end fan 41, Rf is an air flow passage pressure loss curve for the ventilation pathways in the front end, and Rr is an air flow passage pressure loss curve for the ventilation pathways in the rear end.

From FIG. 2, the work point of the front-end fan 40 is the intersection between the curve A1 and the curve Rf, and the work point of the rear-end fan 41 is the intersection between the curve A2 and the curve Rr. In other words, a front-end air flow rate Q3 and a front-end air flow pressure P3 are achieved by the front-end fan 40, and a rear-end air flow rate Q2 and a rear-end air flow pressure P2 are achieved by the rear-end fan 41. Moreover, Q2 is less than Q3 (Q2<Q3), and P2 is greater than P3 (P2>P3).

Thus, the front-end air flow rate of the cooling air flow flowing through the front-end ventilation pathway, in which air enters the front bracket 1 through the front-end air intake apertures 1a, is deflected centrifugally by the front-end fan 40, and is then expelled through the front-end air discharge apertures 1b, is greater than the rear-end air flow rate of the cooling air flow flowing through the rear-end ventilation pathway, in which air enters the rear bracket 2 through the rear-end air intake apertures 2a, is deflected centrifugally by the rear-end fan 40, and is then expelled through the rear-end air discharge apertures 2b. Furthermore, a portion of the cooling air flow entering the front end flows to the rear end through the inside of the rotor 7.

Here, "air flow pressure" means the difference between the pressure generated in front of a resistant member disposed in the cooling air flow created by operation of the fan and that generated behind the resistant member. The greater the air flow pressure, the greater the capacity of the fan is enhanced.

Now, if fans having the blowing performance curve A1 are used for the fans in both the front end and the rear end, the work points of the front-end and rear-end fans are (Q3, P3) and (Q1, P1), respectively. Moreover, Q1<Q2<Q3, and P2>P1>P3.

When a fan having the blowing performance curve A2 is used for the rear-end fan 41, the work point of the rear-end fan 41 is (Q2, P2). In other words, by increasing the capacity of the rear-end fan 41, the rear-end air flow rate can be raised from Q1 to Q2. In this case, the capacity of the rear-end fan 41 is set such that the rear-end air flow rate does not exceed the front-end air flow rate.

In this manner, in Embodiment 1, the front-end air flow rate is greater than the rear-end air flow rate, and the capacity of the rear-end fan 41 is greater than the capacity of the front-end fan 40.

Because the front-end air flow rate capable of effectively cooling the coil end group of the stator coil 36 is greater than the rear-end air flow rate, the stator coil 36 can be sufficiently cooled, enabling temperature increases in the stator coil 36 to be suppressed. In addition, because the capacity of the rear-end fan 41 is greater than the capacity of the front-end fan 40, the rear-end air flow rate is sufficiently ensured and the rectifier 12 and the regulator 18 can be sufficiently cooled, enabling temperature increases in the rectifier 12 and the regulator 18 to be suppressed. Consequently, the automotive alternator obtained enables overall cooling efficiency to be raised.

In addition, because the air flow rate at the front end where wind resistance is small is made greater than the air flow rate at the rear end where wind resistance is great, the automotive alternator obtained enables worsening of wind noise to be suppressed.

Because the stator coil 36 is constructed by connecting a large number of short coil segments 30 having a rectangular cross section, the space factor of the coil segments 30 relative to the slots 15b can be raised, enabling the achievement of increased output.

Because the coil segments 30 are formed into the general U shape, the stator coil 36 obtained can be installed in the stator core by inserting the coil segments into the slots 15b from a first end of the stator core 15 and joining together the free end portions 30c extending outwards at a second end of the stator core 15. Thus, the stator coil 36 installed in the stator core 15 can be prepared easily.

Because the joint-end coil end group 32 has joint portions 31 in which heat dissipation is raised by removing the electrically-insulating coating and is disposed at the front end where the air flow rate is large, heat from the stator coil 36 is efficiently dissipated from the joint-end coil end group 32, effectively suppressing temperature increases in the stator coil 36.

The fan construction used in the automotive alternator according to the present invention will now be explained in detail.

Inventive Example 1

Figure 6:
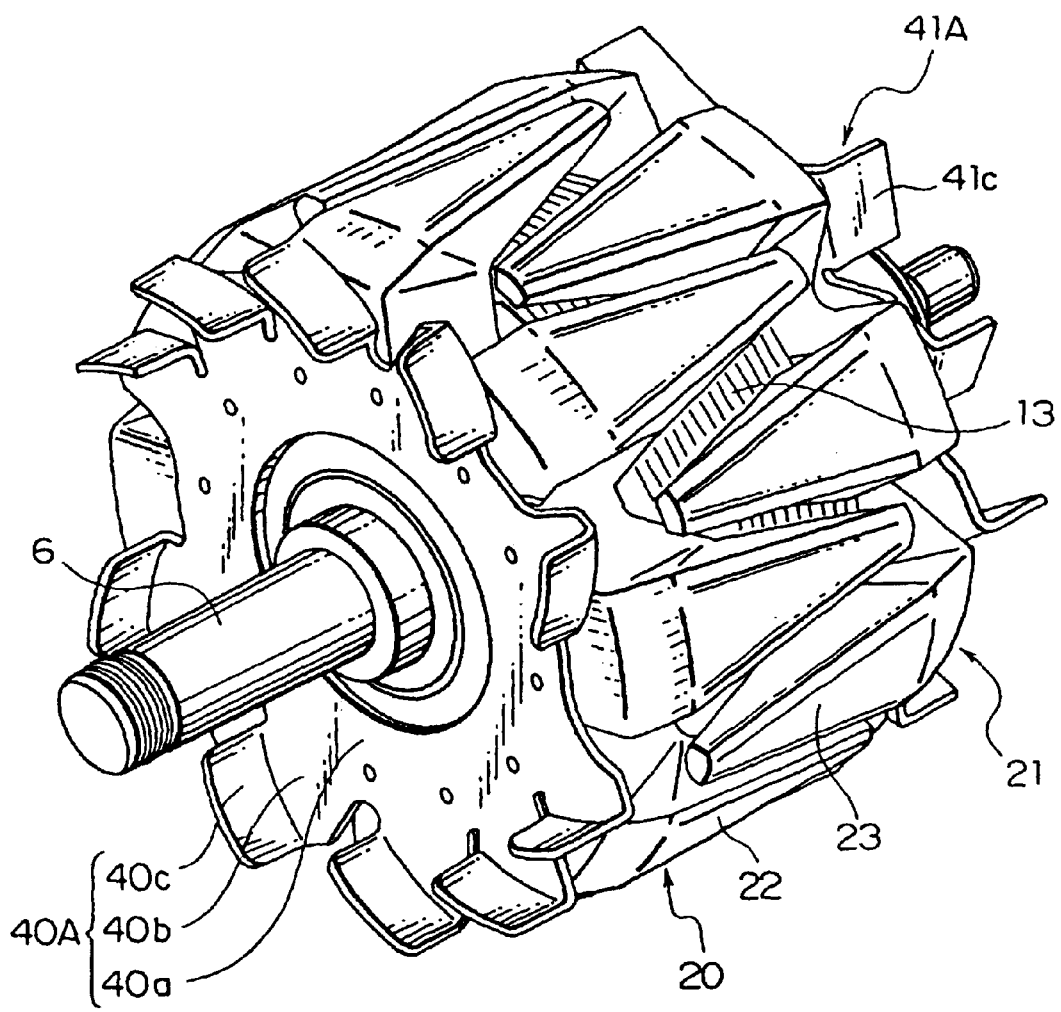
FIG. 6 is a perspective of a rotor according to Inventive Example 1 of the present invention.
Figure 7:
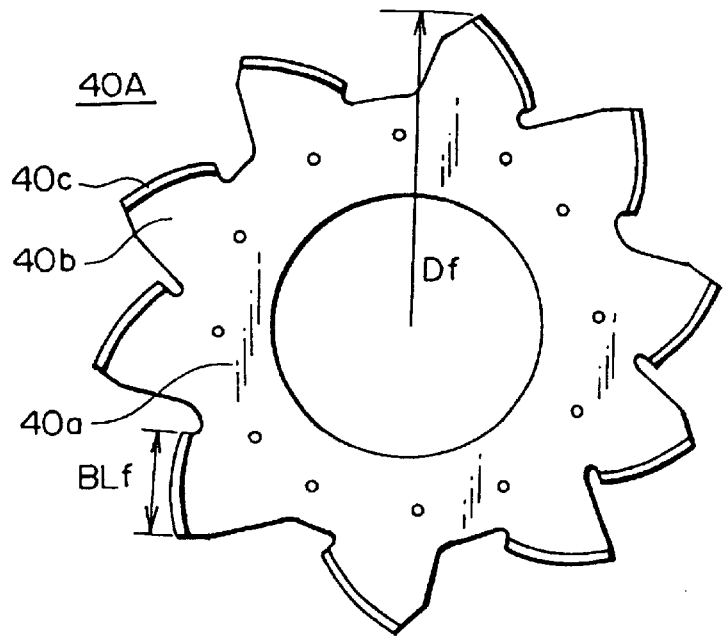
FIG. 7 is a front elevation of a front-end fan according to Inventive Example 1 of the present invention.
Figure 8:
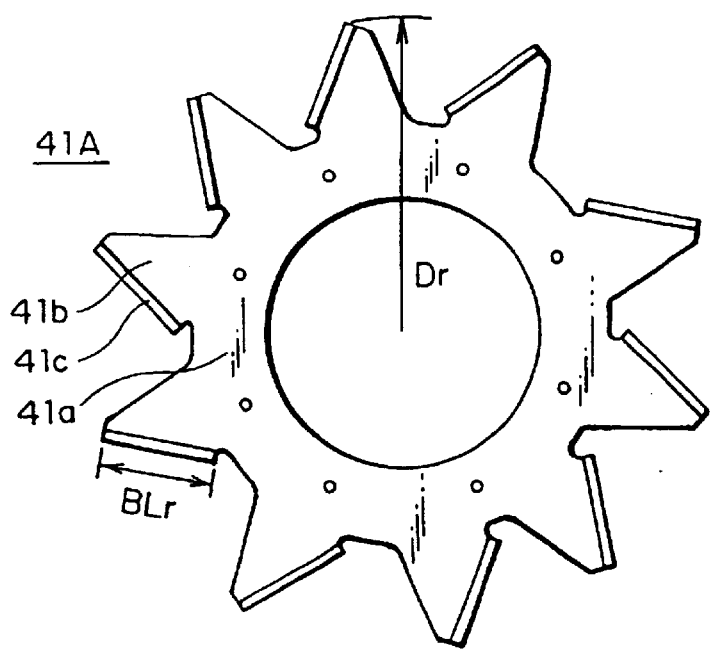
FIG. 8 is a front elevation of a rear-end fan according to Inventive Example 1 of the present invention.

FIG. 6 is a perspective of Inventive Example 1 of a rotor used in the automotive alternator of the present invention, and FIGS. 7 and 8 are front elevations of a front-end fan 40A and a rear-end fan 41A, respectively, used in the rotor shown in FIG. 6.

The front-end and rear-end fans 40A and 41A were formed by working a thin metal sheet and were constituted by: annular fan base portions 40a and 41a; a number of blade base plates 40b and 41b extending radially outwards from outer circumferential edge portions of the fan base portions 40a and 41a; and blades 40c and 41c formed by folding an outer circumferential edge portion of each of the blade base plates 40b and 41b. Outside diameters (Df and Dr), numbers of blades (Nf and Nr), and blade heights (BHf and BHr) were the same for each of the fans 40A and 41A, but a blade chord length (BLr) of the rear-end fan 41A was formed so as to be longer than a blade chord length (BLf) of the front-end fan 40A, making the capacity of the rear-end fan 41A greater than the capacity of the front-end fan 40A. That is, Df=Dr, Nf=Nr, BHf=BHr, and BLf<BLr.

When an automotive alternator fitted with a rotor mounted with the fans 40A and 41A constructed in this manner was operated at a rotational frequency of 5000 rpm, the front-end intake air flow rate $Qf_{IN}$ was 0.05 m$^3$/s, the front-end discharge air flow rate $Qf_{OUT}$ was 0.048 m$^3$/s, the rear-end intake air flow rate $Qr_{IN}$ was 0.033 m$^3$/s, the rear-end discharge air flow rate $Qr_{OUT}$ was 0.035 m$^3$/s, and the front-to-rear air flow rate $Q_{f \rightarrow r}$ was 0.002 m$^3$/s.

According to Inventive Example 1, because the blade chord length (BLr) of the rear-end fan 41A were formed so as to be longer than the blade chord length (BLf) of the front-end fan 40A, the capacity of the rear-end fan 41A was greater than the capacity of the front-end fan 40A, and in addition, the front-end intake air flow rate $Qf_{IN}$ and the front-end discharge air flow rate $Qf_{OUT}$ were greater than the rear-end intake air flow rate $Qr_{IN}$ and the rear-end discharge air flow rate $Qr_{OUT}$.

Consequently, the effects of Embodiment 1 above were achieved.

Furthermore, because the number of blades in each of the front-end and rear-end fans 40A and 41A was ten, the front-end and rear-end air flow rates were increased compared to the conventional example in which the number of blades was eight, enabling temperature increases in the stator coil 36, the rectifier 12, and the regulator 18 to be suppressed further.

Inventive Example 2

Figure 9:
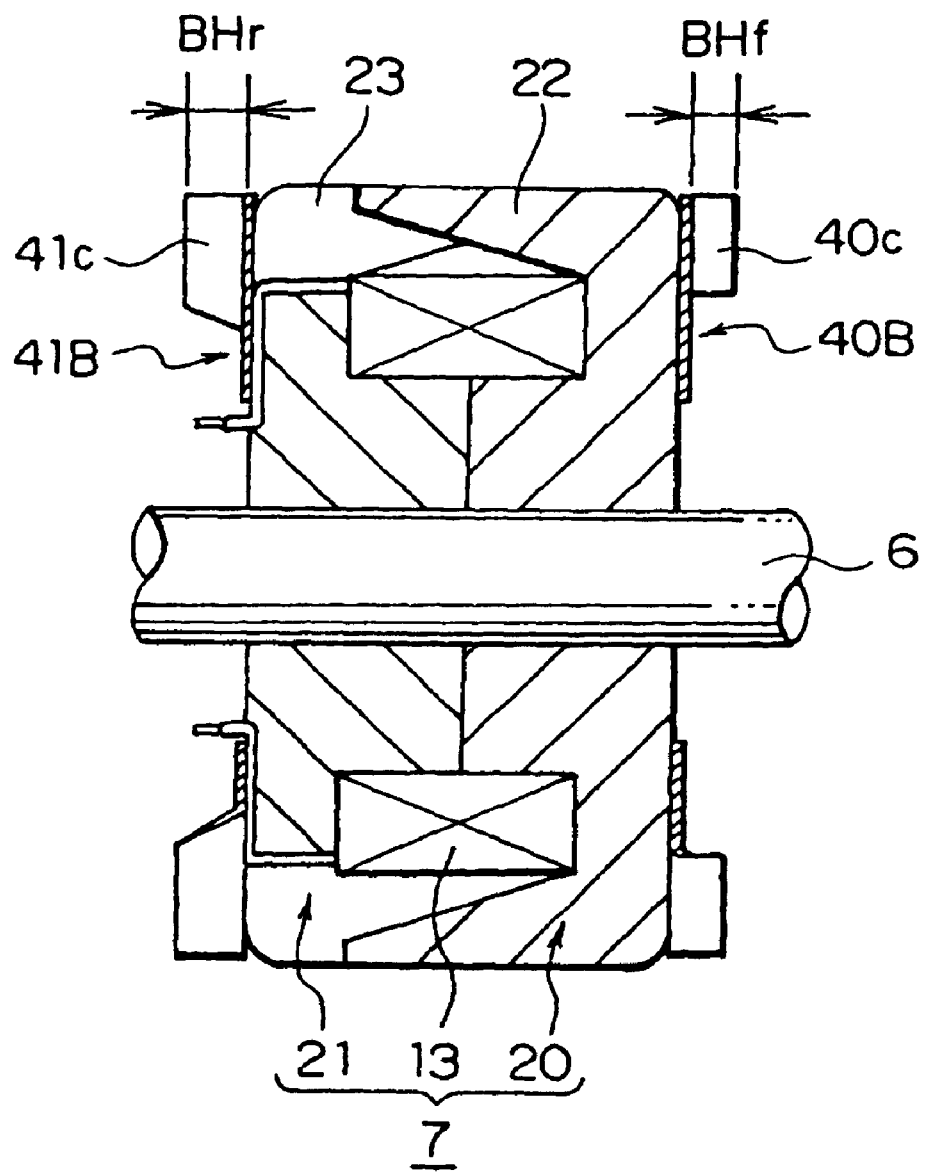
FIG. 9 is a cross section of a rotor according to Inventive Example 2 of the present invention.

As shown in FIG. 9, in Inventive Example 2, the blade height (BHr) of a rear-end fan 41B was formed so as to be higher than the blade height (BHf) of a front-end fan 40B. Moreover, the rest of the construction was the same as in Inventive Example 1.

When an automotive alternator fitted with a rotor mounted with the fans 40B and 41B constructed in this manner was operated at a rotational frequency of 5000 rpm, the front-end intake air flow rate $Qf_{IN}$ was 0.05 m$^3$/s, the front-end discharge air flow rate $Qf_{OUT}$ was 0.045 m$^3$/s, the rear-end intake air flow rate $Qr_{IN}$ was 0.038 m$^3$/s, the rear-end discharge air flow rate $Qr_{OUT}$ was 0.043 m$^3$/s, and the front-to-rear air flow rate $Q_{f \rightarrow r}$ was 0.005 m$^3$/s.

In Inventive Example 2, the front-end intake air flow rate $Qf_{IN}$ and the front-end discharge air flow rate $Qf_{OUT}$ were also greater than the rear-end intake air flow rate $Qr_{IN}$ and the rear-end discharge air flow rate $Qr_{OUT}$.

Furthermore, in Inventive Example 2, because the blade height (BHr) of the rear-end fan 41B was formed so as to be higher than the blade height (BHf) of the front-end fan 40B, the capacity of the rear-end fan 41B was even greater than the capacity of the front-end fan 40B, making the rear-end intake air flow rate $Qr_{IN}$ and the rear-end discharge air flow rate $Qr_{OUT}$ greater than in Inventive Example 1 above.

Thus, temperature increases in the rectifier 12 and the regulator 18 were suppressed further than in Inventive Example 1.

Inventive Example 3

Figure 10:
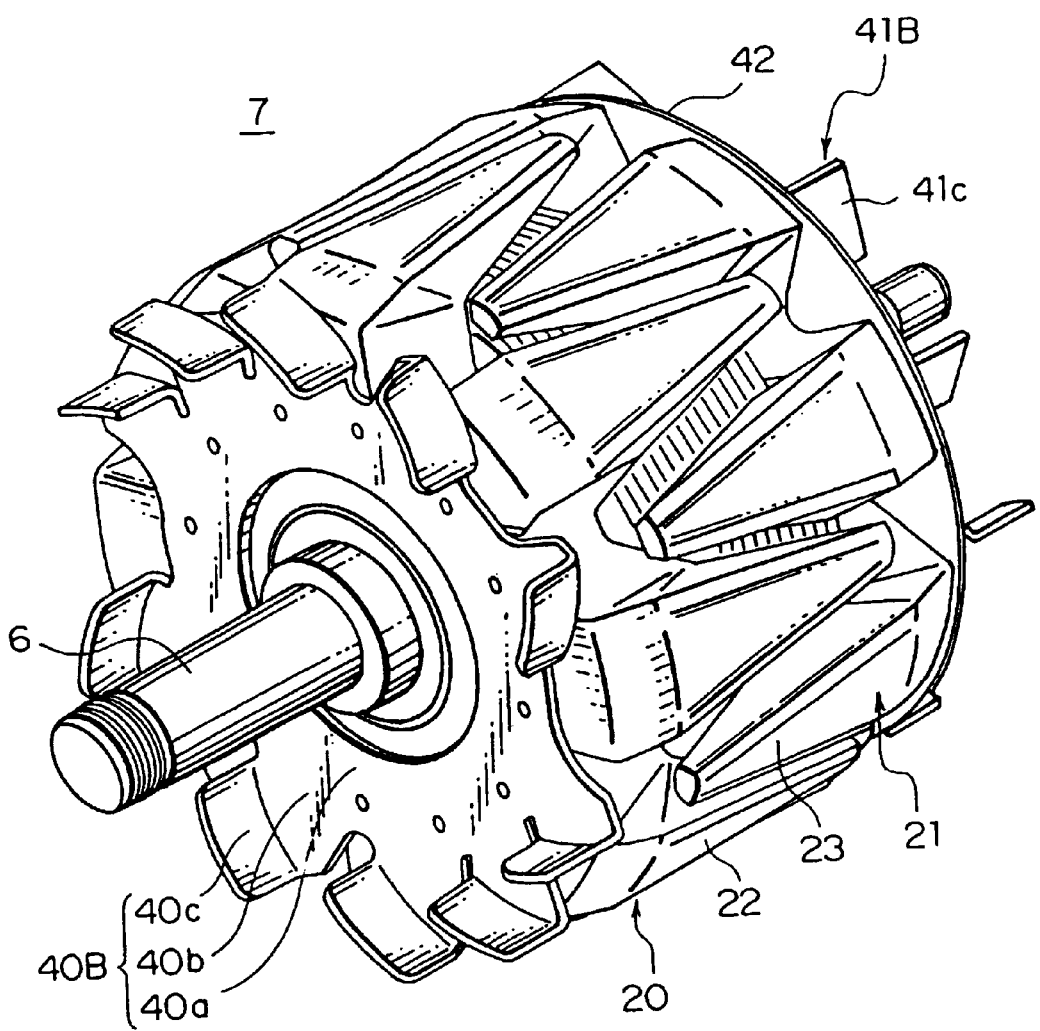
FIG. 10 is a perspective of a rotor according to Inventive Example 3 of the present invention.

As shown in FIG. 10, a shielding plate 42 was mounted between the rear-end fan 41B and the rear-end pole core 21, blocking air gaps formed by valley portions between the rear-end claw-shaped magnetic poles 23 and by the blade base plates 41b. Moreover, the rest of the construction was the same as in Inventive Example 2.

When an automotive alternator fitted with a rotor constructed in this manner was operated at a rotational frequency of 5000 rpm, the frontend intake air flow rate $Qf_{IN}$ was 0.05 m³/s, the front-end discharge air flow rate $Qf_{OUT}$ was 0.05 m³/s, the rear-end intake air flow rate $Qr_{IN}$ was 0.045 m³/s, the rear-end discharge air flow rate $Qr_{OUT}$ was 0.045 m³/s, and the front-to-rear air flow rate $Q_{f \rightarrow r}$ was 0 m³/s.

In Inventive Example 3, the front-end intake air flow rate $Qf_{IN}$ and the front-end discharge air flow rate $Qf_{OUT}$ were also greater than the rear-end intake air flow rate $Qr_{IN}$ and the rear-end discharge air flow rate $Qr_{OUT}$.

Because the ventilation pathway of the cooling air flow flowing from the front-end to the rear-end was blocked by the shielding plate 42, the front-to-rear air flow rate $Q_{f \rightarrow r}$ was eliminated. Thus, because the front-end intake air flow rate $Qf_{IN}$ was able to contribute to the cooling of the front-end coil end group without loss, temperature increases in the stator coil 36 could be reliably suppressed. Because the spaces formed between the blade base plates 41b were blocked by the shielding plate 42, the capacity of the rear-end fan 41B was raised further, increasing the rear-end intake air flow rate $Qr_{IN}$, thereby enabling temperature increases in the rectifier 12 and the regulator 18 to be reliably suppressed.

Inventive Example 4

Figure 11:
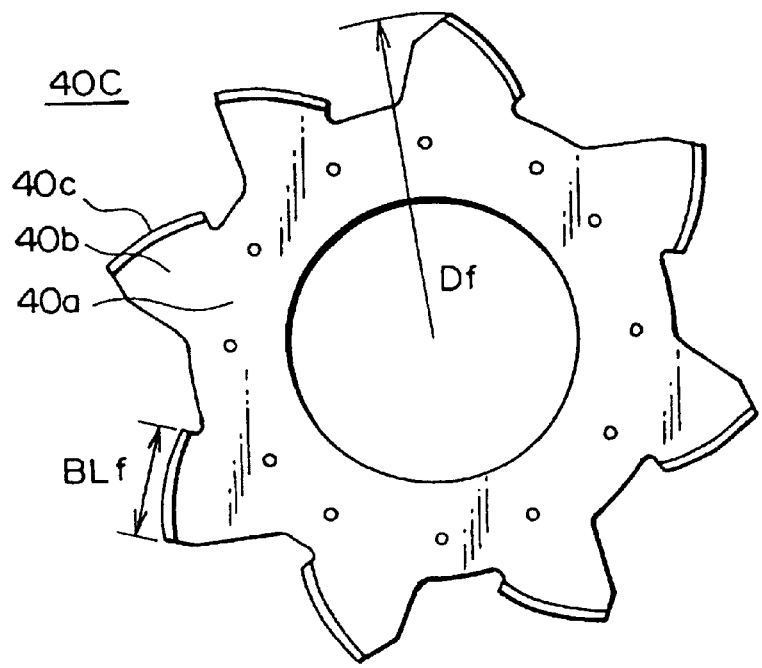
FIG. 11 is a front elevation of a front-end fan according to Inventive Example 4 of the present invention.
Figure 12:
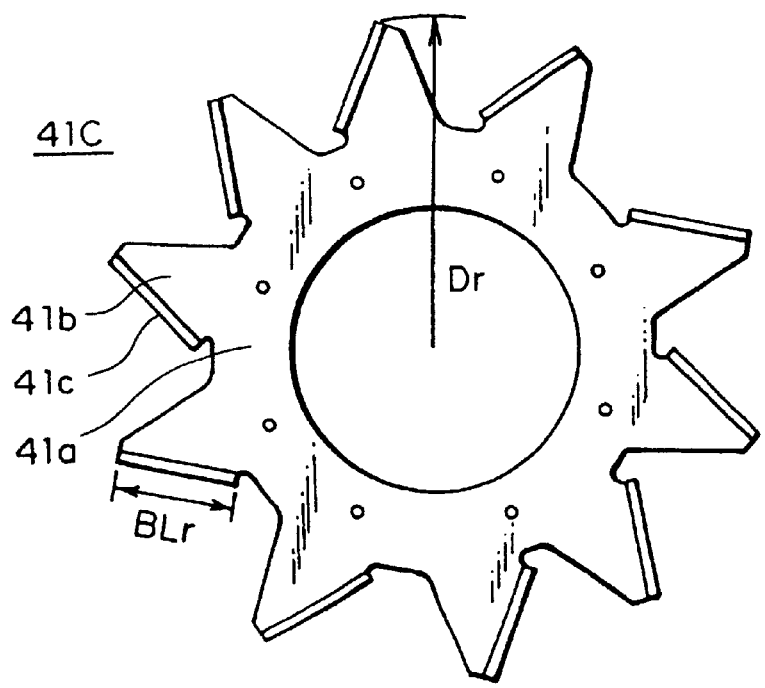
FIG. 12 is a front elevation of a rear-end fan according to Inventive Example 4 of the present invention.

As shown in FIGS. 11 and 12, in Inventive Example 4, a front-end fan 40C and a rear-end fan 41C had identical outside diameters (Df and Dr), blade heights (BHf and BHr), and blade chord lengths (BLf and BLr), the number of blades (Nf) in the front-end fan 40C was eight, and the number of blades (Nr) in the rear-end fan 41C was ten. That is, Df=Dr, Nf<Nr, BHf=BHr, and BLf=BLr.

Consequently, in Inventive Example 4, because a fan having a greater number of blades than the number of blades in the front-end fan 40C was used for the rear-end fan 41C, the capacity of the rear-end fan 41C was also greater than the capacity of the front-end fan 40C, enabling the effects of Embodiment 1 above to be achieved.

Inventive Example 5

Figure 13:
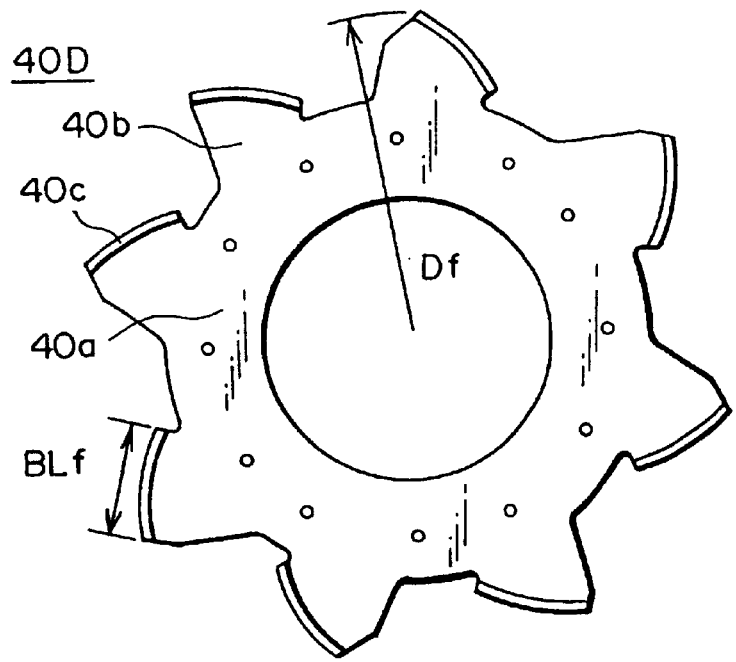
FIG. 13 is a front elevation of a front-end fan according to Inventive Example 5 of the present invention.
Figure 14:
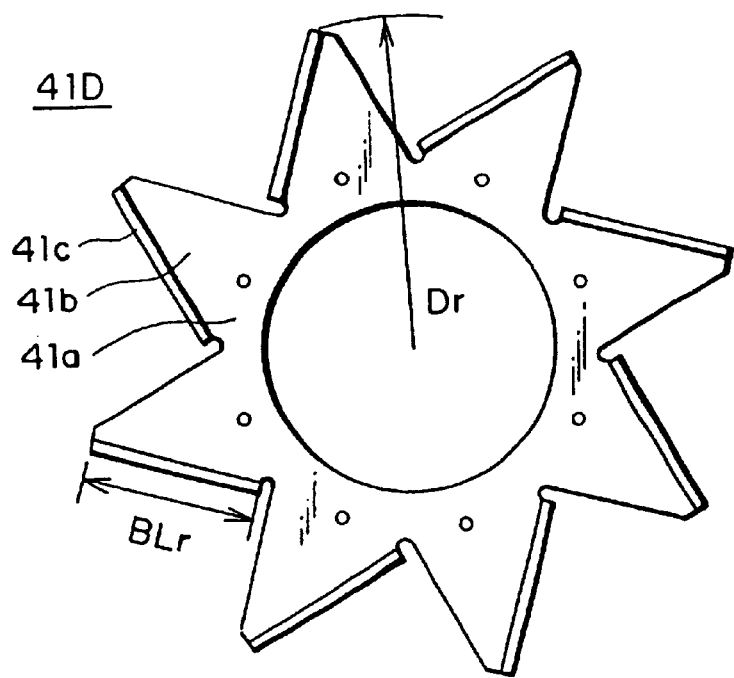
FIG. 14 is a front elevation of a rear-end fan according to Inventive Example 5 of the present invention.

As shown in FIGS. 13 and 14, in Inventive Example 5, a front-end fan 40D and a rear-end fan 41D had identical outside diameters (Df and Dr), blade heights (BHf and BHr), and numbers of blades (Nf and Nr), and the blade chord length (BLr) of the rear-end fan 41D was formed so as to be longer than the blade chord length (BLf) of the front-end fan 40D. That is, Df=Dr, Nf=Nr, BHf=BHr, and BLf<BLr.

Consequently, in Inventive Example 5, because a fan having a longer blade chord length than the blade chord length of the front-end fan 40D was used for the rear-end fan 41D, the capacity of the rear-end fan 41C was also greater than the capacity of the front-end fan 40C, enabling the effects of Embodiment 1 above to be achieved.

Inventive Example 6

Figure 15:
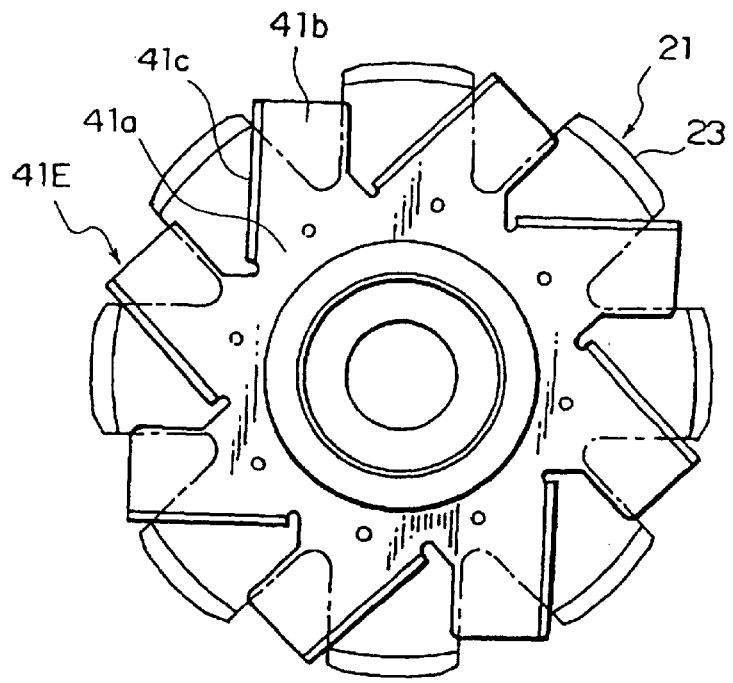
FIG. 15 is a front elevation of a mounted state of a rear-end fan according to Inventive Example 6 of the present invention.

As shown in FIG. 15, in Inventive Example 6, the blade base plates 41b of a rear-end fan 41E were enlarged, and the rear-end fan 41E were fastened to the rear-end pole core 21 such that the enlarged blade base plates 41b covered the valley portions between adjacent rear-end claw-shaped magnetic poles 23. Moreover, the rest of the construction was the same as in Inventive Example 5.

In Inventive Example 6, because the valley portions between adjacent rear-end claw-shaped magnetic poles 23 were blocked by the blade base plates 41b when viewed axially, the front-to-rear air flow rate $Q_{f \rightarrow r}$ was limited. Thus, because the front-end intake air flow rate $Qf_{IN}$ was able to contribute to the cooling of the front-end coil end group with limited loss, temperature increases in the stator coil 36 could be further suppressed. Because the spaces formed between the blade base plates 41b were blocked by end surfaces of the rear-end claw-shaped magnetic poles 23, the capacity of the rear-end fan 41E was raised further, increasing the rear-end intake air flow rate $Qr_{IN}$, thereby enabling temperature increases in the rectifier 12 and the regulator 18 to be reliably suppressed.

Inventive Example 7

In Inventive Example 7, an outside diameter of a front-end fan 40 was formed so as to be smaller than an outside diameter of a rear-end fan 41. Moreover, the rest of the construction was the same as in Inventive Example 5.

Consequently, in Inventive Example 7, because a fan having a smaller outside diameter than the outside diameter of the rear-end fan 41 was used for the front-end fan 40, the capacity of the rear-end fan 41 was also greater than the capacity of the front-end fan 40, enabling the effects of Embodiment 1 above to be achieved.

Inventive Example 8

In each of the above inventive examples, fans 40 and 41 were used as the front-end and rear-end blowing means, but in Inventive Example 8, the front-end pole core 20 was used as the front-end blowing means and a rear-end fan 41 was used as the rear-end blowing means.

Here, because the capacity of the front-end pole core 20 as a blowing means was small compared to the rear-end fan 41, the capacity of the rear-end blowing means was also greater than the capacity of the front-end blowing means in Inventive Example 8, enabling the same effects to be achieved.

Furthermore, because the front-end fan was eliminated, costs could be reduced.

Inventive Example 9

In Inventive Examples 1 to 7 above, fans 40 and 41 were used as the front-end and rear-end blowing means, but in Inventive Example 9, the front-end and rear-end pole cores 20 and 21 were used as the front-end and rear-end blowing means.

Figure 16:
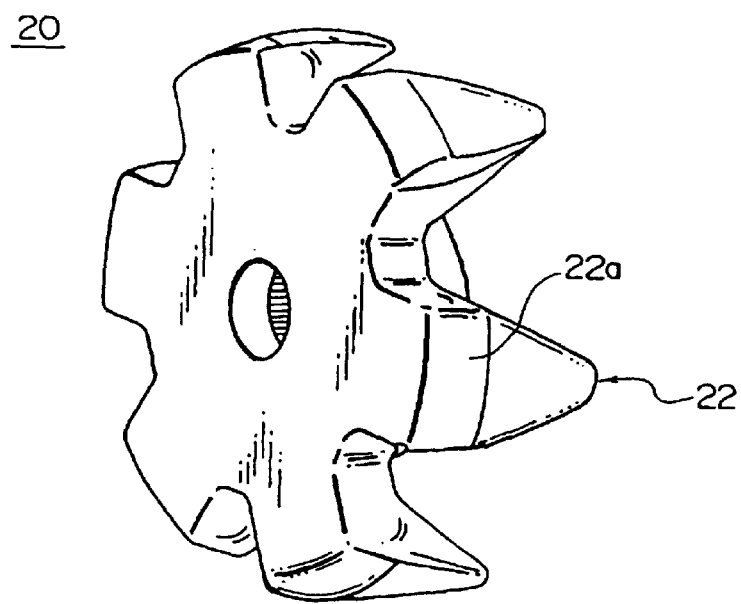
FIG. 16 is a perspective of a front-end pole core according to Inventive Example 9 of the present invention.
Figure 17:
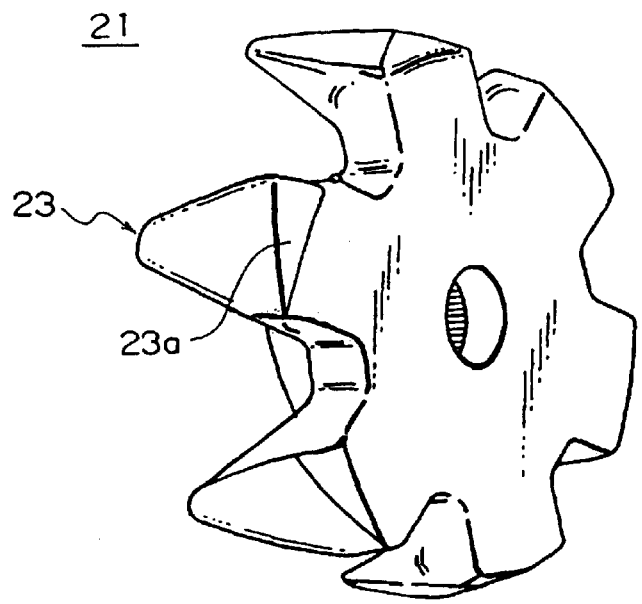
FIG. 17 is a perspective of a rear-end pole core according to Inventive Example 9 of the present invention.

In Inventive Example 9, as shown in FIG. 16, front-end shoulder portions 22a were formed on the claw-shaped magnetic poles 22 of the front-end pole core 20 in an inclined plane having a predetermined angle relative to a front-end end surface of the front-end pole core 20 and intersecting the front-end end surface of the front-end pole core 20 on a circle centered on the axial center of the front-end pole core 20. On the other hand, as shown in FIG. 17, rear-end shoulder portions 23a were formed on the claw-shaped magnetic poles 23 of the rear-end pole core 21 in an inclined plane having a predetermined angle relative to a rear-end end surface of the rear-end pole core 21 and having a line of intersection with the rear-end end surface of the rear-end pole core 21 which gradually approached the axial center of the rear-end pole core 21 backwards relative to the direction of rotation.

Thus, due to the differences in the shapes of the shoulder portions 22a and 23a of the front-end and rear-end claw-shaped magnetic poles 22 and 23, the capacity of the rear-end pole core 21 as a blowing means was greater than the capacity of the front-end pole core 20 as a blowing means, enabling the fans 40 and 41 to be dispensed with, thereby enabling costs to be reduced further.

Embodiment 2

Figure 18:
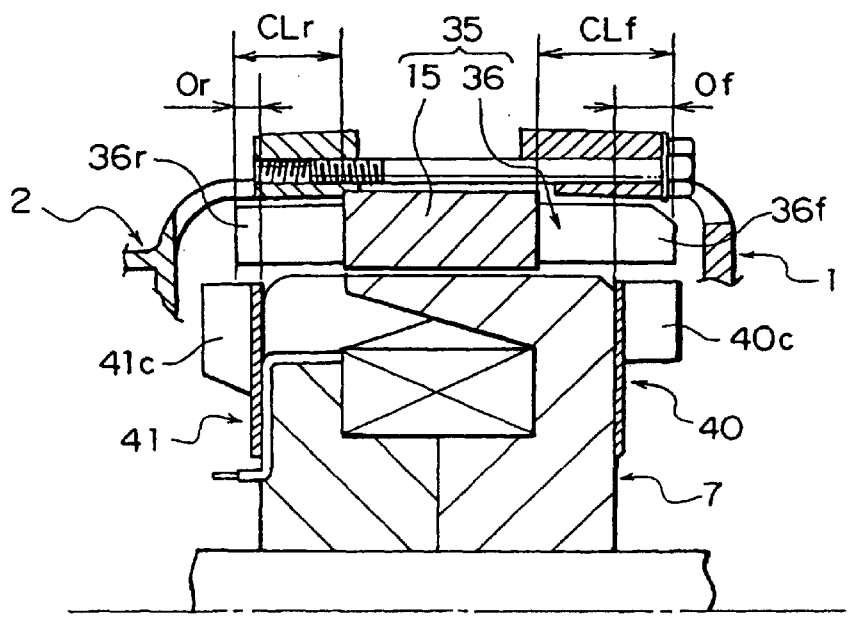
FIG. 18 is a partial cross section of an automotive alternator according to Embodiment 2 of the present invention.

As shown in FIG. 18, in Embodiment 2, the stator 35 is disposed such that a front-end axial height (CLf) of the front-end coil end group 36f of the stator coil 36 is greater than a rear-end axial height (CLr) of the rear-end coil end group 36r, and a front-end axial overlap (Of) between the front-end coil end group 36f and the front-end fan 40 is greater than a rear-end axial overlap (Or) between the rear-end coil end group 36r and the rear-end fan 41. In other words, CLr<CLf and Or<Of Moreover, the rest of the construction is the same as in Embodiment 1.

According to Embodiment 2, the stator 35 is disposed such that the front-end axial height (CLf) of the front-end coil end group 36f of the stator coil 36 is greater than the rear-end axial height (CLr) of the rear-end coil end group 36r. Thus, the volume of the coil end group exposed to the cooling air flow is limited in the rear end where cooling efficiency is poor, and the volume of the coil end group exposed to the cooling air flow is increased in the front end where cooling efficiency is good, cooling the stator coil 36 effectively.

The stator 35 is also disposed such that the front-end axial overlap (Of) between the front-end coil end group 36f and the front-end fan 40 is greater than the rear-end axial overlap between the rear-end coil end group 36r and the rear-end fan 41. Thus, the volume of the coil end group exposed to the cooling air flow is increased in the front end where cooling efficiency is good, cooling the stator coil effectively.

Naturally, the overall cooling efficiency can be raised further and noise can be significantly decreased in Embodiment 2 as well by adopting the constructions from any of Inventive Examples 1 to 9 above.

Moreover, in Embodiments 1 and 2 above, the coil segments 30 used were formed into a general U shape, but the present invention is not limited to coil segments 30 formed into a general U shape; the coil segments may be short conductor segments extending linearly.

Embodiment 3

In Embodiments 1 and 2 above, the stator coil was constructed by joining a large number of short coil segments 30 so as to adopt a predetermined overall winding construction, but in Embodiment 3, the stator coil is constructed so as to adopt a predetermined overall winding construction by linking a plurality of winding sub-portions each formed by installing one strand of wire composed of continuous wire into the stator core.

Figure 19:
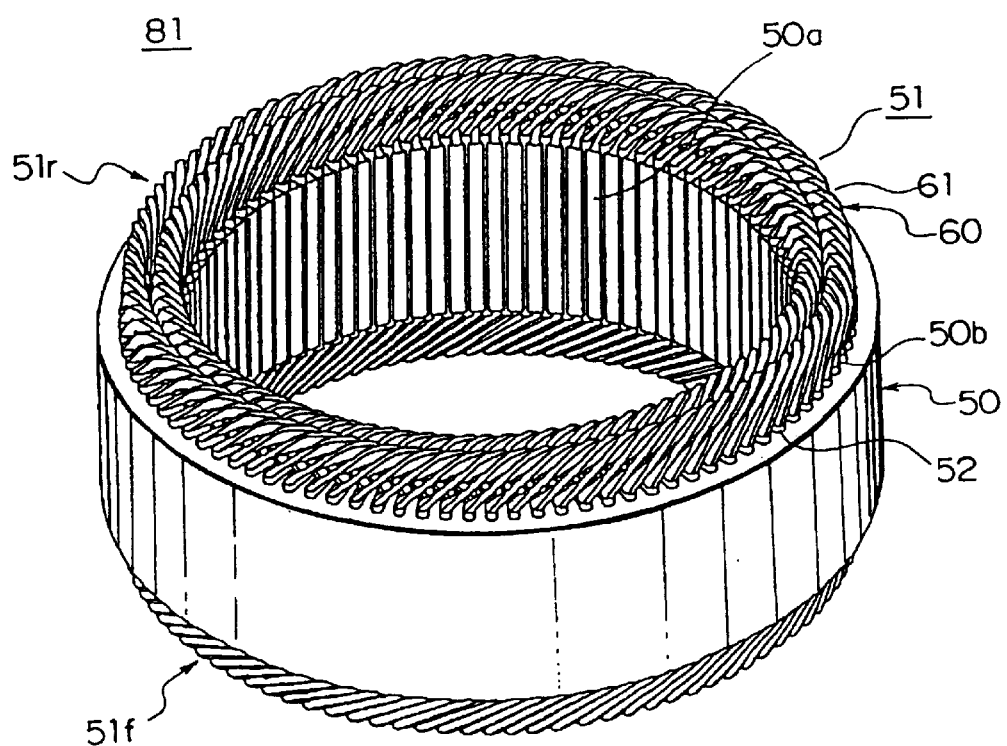
FIG. 19 is a perspective of a stator used in an automotive alternator according to Embodiment 3 of the present invention.

FIG. 19 is a perspective of a stator of an automotive alternator according to Embodiment 3 of the present invention. Connecting portions such as crossover-connections have been omitted from the diagram to facilitate explanation.

In FIG. 19, the stator 81 includes: a stator core 50 composed of a cylindrical laminated core in which a plurality of teeth 50a having a generally rectangular cross sectional shape are disposed at even pitch in a circumferential direction so as to protrude radially inwards, slots 50b extending axially being formed between the teeth 50a; a stator coil 51 installed in the stator core 50; and insulators 52 mounted in the slots 50b for electrically insulating the stator coil 51 from the stator core 50. The stator coil 51 includes front-end and rear-end coil end groups 51f and 51r which extend outwards at a front end and a rear end of the stator core 50.

Furthermore, the stator coil 51 is provided with two winding assemblies 60 disposed in two rows radially. The winding assemblies 60 are each constituted by two winding sub-portions in each of which one strand of wire 61 is folded over outside the slots 50b at end surfaces of the stator core 50 and wound into a wave winding so as to alternately occupy an inner layer and an outer layer in a slot depth direction within slots 50b a predetermined number of slots apart. In this case, the stator core 50 is formed with ninety-six slots 50b at even pitch so as to house two three-phase stator winding groups 53 (described below) such that the number of slots housing the two three-phase stator winding groups 53 corresponds to the number of magnetic poles (sixteen) in the rotor 7. In other words, the number of slots per phase per pole is two. Continuous wire of a copper wire material having a flat cross section coated with an electrically-insulating coating, for example, is used in the strands of wire 61.

Figure 20:
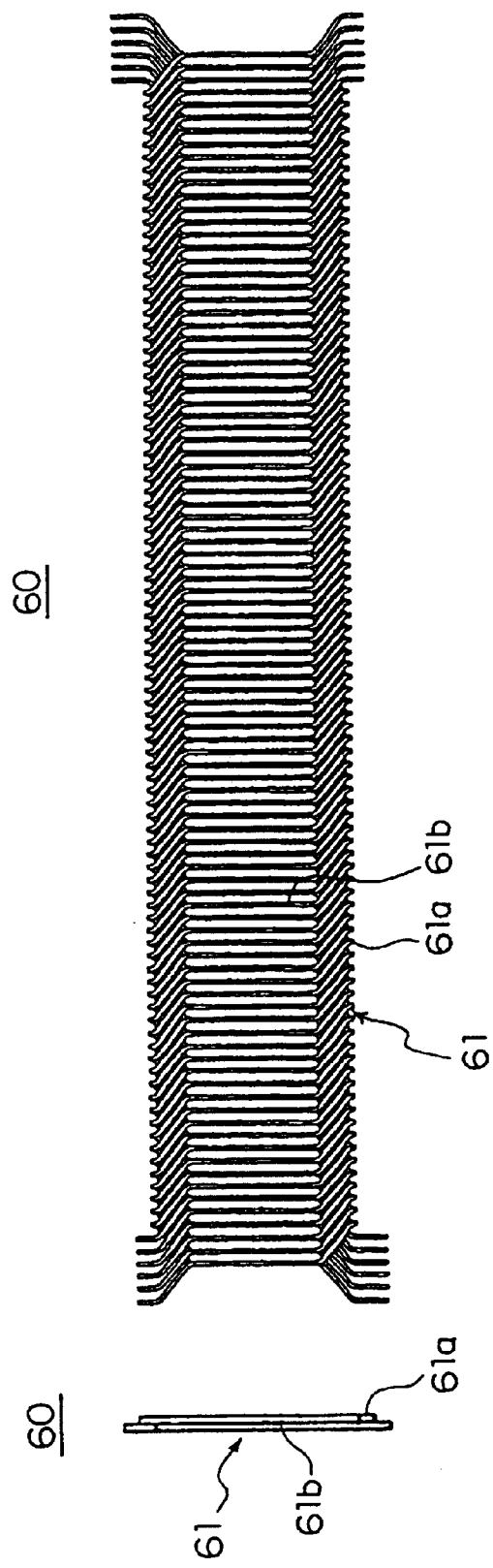
FIG. 20A is an end elevation of a winding assembly constituting a stator coil in the stator of the automotive alternator according to Embodiment 3 of the present invention.
FIG. 20B is a plan of the winding assembly constituting the stator coil in the stator of the automotive alternator according to Embodiment 3 of the present invention.

The construction of the winding assemblies 60 will be explained here in detail with reference to FIGS. 20A to 22. FIG. 20A is an end elevation of a winding assembly constituting a stator coil in the stator of the automotive alternator according to Embodiment 3 of the present invention, FIG. 20B is a plan of the winding assembly constituting the stator coil in the stator of the automotive alternator according to Embodiment 3 of the present invention, FIG. 21 is a perspective of part of a strand of wire constituting the stator coil in the stator of the automotive alternator according to Embodiment 3 of the present invention, and FIG. 22 is a diagram explaining an arrangement of the strands of wire constituting the stator coil in the stator of the automotive alternator according to Embodiment 3 of the present invention.

Figure 21:
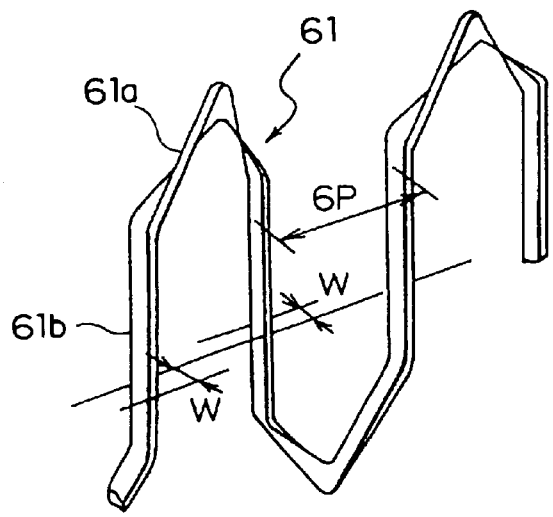
FIG. 21 is a perspective of part of a strand of wire constituting the stator coil in the stator of the automotive alternator according to Embodiment 3 of the present invention.
Figure 22:
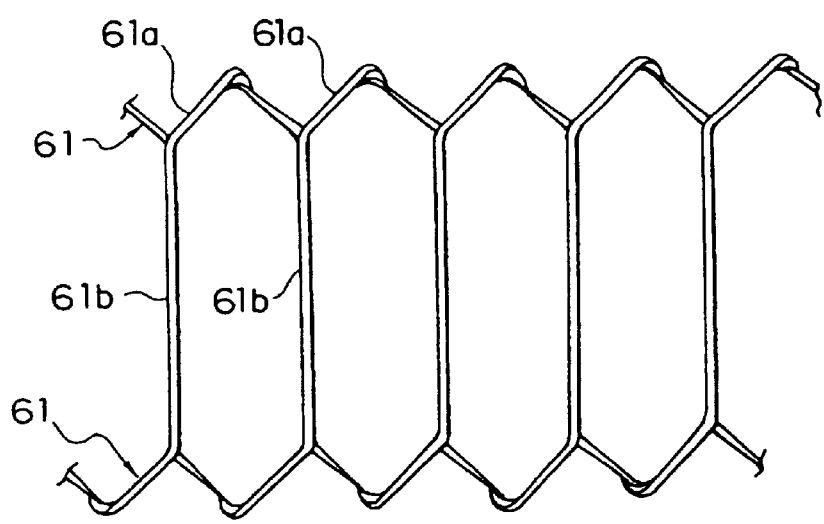
FIG. 22 is a diagram explaining an arrangement of the strands of wire constituting the stator coil in the stator of the automotive alternator according to Embodiment 3 of the present invention.

As shown in FIG. 21, each strand of wire 61 constituting part of the winding assemblies 60 is formed into a planar pattern in which straight portions 61b connected by turn portions 61a are lined up at a pitch of six slots (6P). Adjacent straight portions 61b are offset by a distance equal to one width (W) of the strands of wire 61 and are linked by the turn portions 61a. As shown in FIG. 22, two strands of wire 61 formed in the above pattern are offset by a pitch of six slots and arranged such that straight portions 61b thereof overlap to constitute a wire-strand pair. As shown in FIGS. 20A and 20B, the winding assemblies 60 are constructed by arranging six wire-strand pairs arranged in the above manner so as to be offset by a pitch of one slot from each other. Six end portions of the strands of wire 61 each extend outwards from first and second sides at first and second ends of the winding assemblies 60. Furthermore, the turn portions 61a which constitute the coil ends are arranged so as to line up in rows on first and second side portions of the winding assemblies 60.

The two winding assemblies 60 constructed in this manner are installed into the stator core 50 in two rows radially and each of the strands of wire 61 are joined so as to adopt the predetermined winding construction. The turn portions 61a of the strands of wire 61 extending outwards and folded over at end surfaces of the stator core 50 form the coil ends. The turn portions 61a which are formed into a substantially identical shape at both axial ends of the stator core 50 are mutually spaced circumferentially and radially, and arranged neatly in two rows circumferentially to form the front-end and rear-end coil end groups 51f and 51r.

The winding assemblies 60 can be prepared by arranging 12 strands of the continuous wire, for example, at a pitch of one slot in a plane and simultaneously folding the twelve strands of continuous wire into a lightning-bolt shape in the plane, then folding the strands up perpendicularly using a jig. At this time, crossover connections, output wires, and neutral-point leads (not shown) are formed on the first and second side portions of the winding assemblies 60 by pulling out only predetermined strands of the continuous wire when the twelve strands of wire are being folded into the lightning-bolt shape.

Figure 23:
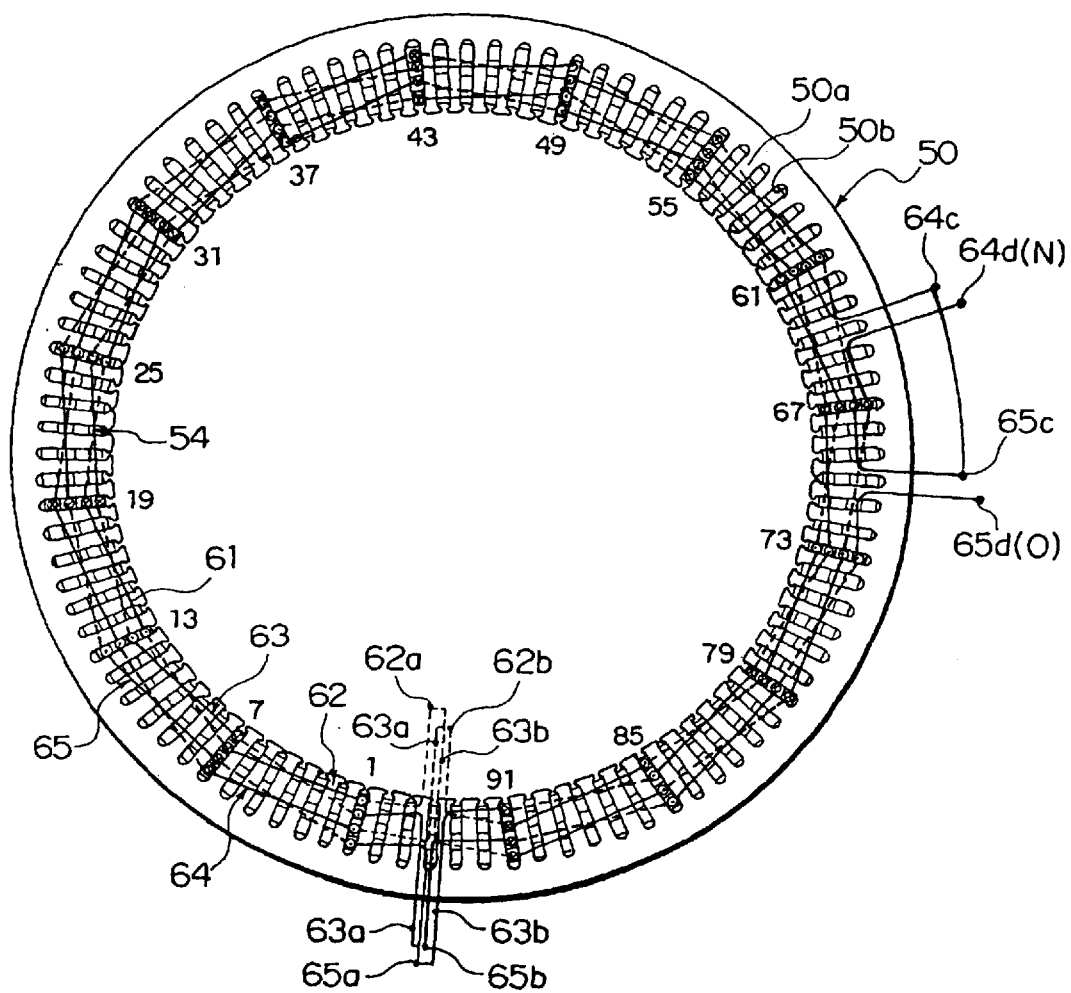
FIG. 23 is an end elevation explaining connections in one stator coil phase portion in the stator of the automotive alternator according to Embodiment 3 of the present invention.

Next, the winding construction of one stator winding phase portion 54 will be explained in detail with reference to FIG. 23. Moreover, in FIG. 23, the wiring at the rear end of the stator core 50 is indicated by solid lines, and the wiring at front end by broken lines.

One stator winding phase portion 54 is constituted by first to fourth winding sub-portions 62 to 65 each composed of one strand of wire 61. The first winding sub-portion 62 is constructed into a wave winding in which one strand of wire 61 alternately occupies a first position from an inner circumferential side (a first address) and a second position from the inner circumferential side (a second address) inside the slots 50b in every sixth slot from Slot Numbers 1 to 91. The second winding sub-portion 63 is constructed into a wave winding in which a strand of wire 61 alternately occupies the second address and the first address inside the slots 50b in every sixth slot from Slot Numbers 1 to 91. The third winding sub-portion 64 is constructed into a wave winding in which a strand of wire 61 alternately occupies a third position from the inner circumferential side (a third address) and a fourth position from the inner circumferential side (a fourth address) inside the slots 50b in every sixth slot from Slot Numbers 1 to 91. The fourth winding sub-portion 65 is constructed into a wave winding in which a strand of wire 61 alternately occupies the fourth address and the third address inside the slots 50b in every sixth slot from Slot Numbers 1 to 91.

Thus, the first to fourth winding sub-portions 62 to 65 each constitute a winding sub-portion having one turn in which one strand of wire 61 is wound into every sixth slot 50b so as to alternately occupy an inner layer and an outer layer in a slot depth direction. Four strands of wire 61 are arranged to line up radially in one row within each slot 50b with the longitudinal direction of their rectangular cross sections aligned in a radial direction.

At the rear end of the stator core 50, a first end portion 63a of the second winding sub-portion 63 extending outwards from the second address of Slot Number 1 and a second end portion 65b of the fourth winding subportion 65 extending outwards from the third address of Slot Number 91 are joined, and in addition, a first end portion 65a of the fourth winding sub-portion 65 extending outwards from the fourth address of Slot Number 1 and a second end portion 63b of the second winding sub-portion 63 extending outwards from the first address of Slot Number 91 are joined to form a winding having two turns.

At the front end of the stator core 50, a first end portion 62a of the first winding sub-portion 62 extending outwards from the first address of Slot Number 1 and a second end portion 64b of the third winding subportion 64 extending outwards from the fourth address of Slot Number 91 are joined, and in addition, a first end portion 64a of the third winding sub-portion 64 extending outwards from the third address of Slot Number 1 and a second end portion 62b of the first winding sub-portion 62 extending outwards from the second address of Slot Number 91 are joined to form a winding having two turns.

In addition, a portion of the strand of wire 61 of the third winding sub-portion 64 extending outwards at the rear end of the stator core 50 from the third address of Slot Number 61 and the fourth address of Slot Number 67 is cut, and a portion of the strand of wire 61 of the fourth winding sub-portion 65 extending outwards at the rear end of the stator core 50 from the third address of Slot Number 67 and the fourth address of Slot Number 73 is also cut. A first cut end 64c of the third winding sub-portion 64 and a first cut end 65c of the fourth winding sub-portion 65 are joined to form one stator winding phase portion 54 having four turns connecting the first to fourth winding sub-portions 62 to 65 in series.

Moreover, the joint portion between the first cut end 64c of the third winding sub-portion 64 and the first cut end 65c of the fourth winding sub-portion 65 becomes a crossover connection connecting portion, and a second cut end 64d of the third winding sub-portion 64 and a second cut end 65d of the fourth winding sub-portion 65 become a neutral-point (N) and an output wire (O), respectively.

Figure 24:
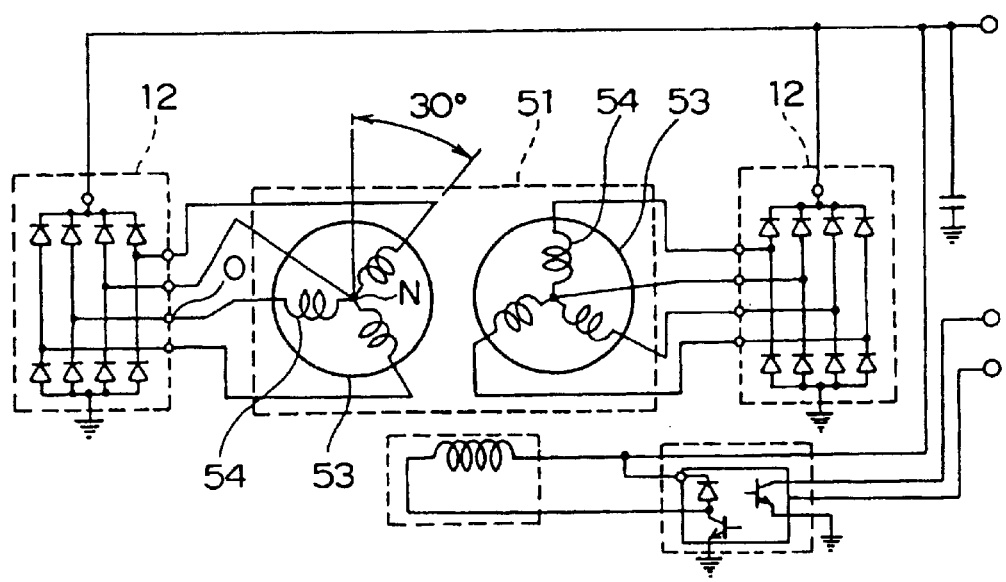
FIG. 24 is a circuit diagram of the stator of the automotive alternator according to Embodiment 3 of the present invention.

A total of six stator winding phase portions 54 are similarly formed by offsetting by one slot at a time the slots 50b into which the strands of wire 61 are installed. Then, as shown in FIG. 24, three stator winding phase portions 54 are connected into each of two star connections to form the two three-phase stator winding groups 53. Each of the three-phase stator winding groups 53 is connected to its own rectifier 12, and the rectifiers 12 are connected in parallel so that the direct-current output from each is combined.

Thus, the strands of wire 61 constituting the first to fourth winding sub-portions 62 to 65 are each wound into a wave winding so as to extend out of first slots 50b at end surfaces of the stator core 50, fold back, and enter second slots 50b six slots away. Each of the strands of wire 61 is wound so as to alternately occupy the inner layer and the outer layer relative to the slot depth direction (the radial direction) in every sixth slot. The first winding sub-portions 62 and the second winding sub-portions 63 are inversely wound and offset by an electrical angle of 180° relative to each other and constitute the first winding assembly 60. Similarly, the third winding sub-portions 43 and the fourth winding sub-portions 44 are inversely wound and offset by an electrical angle of 180° relative to each other and constitute the second winding assembly 60.

Embodiment 3 is constructed similarly to Embodiment 1 above except for the fact that the stator 81 is used in place of the stator 8. Thus, the overall cooling efficiency can be raised further and noise can be significantly decreased in Embodiment 3 as well by adopting the constructions from any of Inventive Examples 1 to 9 above.

Furthermore, the axial height of the turn portions 61a constituting the front-end coil end group may be made greater than the axial height of the turn portions 61a in the rear-end coil end group. In that case, the volume of the coil end group exposed to the cooling air flow is limited in the rear end, where cooling efficiency is poor, and the volume of the coil end group exposed to the cooling air flow is increased in the front end, where cooling efficiency is good, cooling the stator coil 51 effectively.

According to Embodiment 3, the stator coil 51 is constructed by linking six stator winding phase portions 54 to form two three-phase stator winding groups 53. Each of the stator winding phase portions 54 is constructed from one strand of wire 61 constituted by a large number of straight portions 61b housed inside the slots 50b and a large number of turn portions 61a linking together end portions of adjacent straight portions 61b outside the slots 50b by housing the straight portions 61b in every sixth slot 50b so as to occupy different layers relative to a slot depth direction. Thus, in Embodiment 3, the number of joints in the stator coil is significantly reduced compared to Embodiment 1 in which a large number of U-shaped coil segments 30 were used, enabling the productivity of the stator to be improved, and softening of the electrical conductors due to welding is eliminated, improving the rigidity of the stator, thereby enabling reducing magnetic noise to be reduced.

Moreover, in Embodiment 3 above, one strand of wire 61 is wound into a wave winding having one turn per lap so as to alternately occupy different layers in every sixth slot, but the winding construction of the strand of wire is not limited to this; one strand of wire may be wound into a lap winding having two turns per lap so as to alternately occupy different layers in every sixth slot, for example.

Each of the above embodiments uses coil segments 30 and strands of wire 61 having a rectangular cross section, but the coil segments and strands of wire are not limited to a rectangular cross section; they may have a circular cross section, or a portion of coil segments or strands of wire having a circular cross section may be formed with a rectangular cross section.

In each of the above embodiments, the slots 15b (50b) are disposed at an even pitch, but it is not necessary to dispose the slots 15b (50b) at an even pitch; they may be disposed at an uneven pitch.

As shown in FIG. 2, in each of the above embodiments, the capacity (air flow pressure) of the rear-end fan is greater than the capacity of the front-end fan at all air flow rate points, but in practice, the capacity (air flow pressure) of the rear-end fan only needs to be greater than the capacity of the front-end fan in the working air flow region of the automotive alternator. Furthermore, it is not necessary to maintain this relationship for all rotational frequencies; the fans may be set to satisfy this relationship in rotational frequency regions where temperature and wind noise are a problem.

The present invention is constructed in the above manner and exhibits the effects described below.

According to one aspect of the present invention, there is provided an automotive alternator including:

In order to achieve the above object, according to one aspect of the present invention, there is provided an automotive alternator including:

a rotor fastened to a shaft rotatably supported by a front bracket and a rear bracket, the rotor having a pair of Lundell-type pole cores disposed inside the brackets;

a stator supported by the brackets, the stator being disposed so as to cover an outer circumference of the rotor, the stator comprising:
  a cylindrical stator core in which a plurality of slots having grooves lying in an axial direction are disposed circumferentially so as to open onto an inner circumferential side; and
  a stator coil installed in the stator core so as to constitute a predetermined winding construction;

a pulley fastened to a front end of the shaft; and a rectifier disposed at a rear end of the rotor, wherein a plurality of front-end and rear-end air intake apertures are disposed in axial end surfaces of the front and rear brackets, respectively;

a plurality of front-end and rear-end air discharge apertures are disposed in radial side surfaces of the front and rear brackets, respectively; and front-end and rear-end blowing means are disposed at front and rear axial ends of the rotor, respectively,
  whereby a front-end ventilation pathway in which a cooling air flow flows through the front-end air intake apertures into the front-end bracket and flows out through the front-end air discharge apertures, a rear-end ventilation pathway in which a cooling air flow flows through the rear-end air intake apertures into the rear-end bracket and flows out through the rear-end air discharge apertures, and a front-to-rear ventilation pathway in which a cooling air flow flows through an inner side of the rotor between the front end and the rear end each is generated by operation of the blowing means,
  wherein a capacity of the rear-end blowing means is greater than a capacity of the front-end blowing means, and a front-end air intake flow rate is greater than a rear-end air intake flow rate, improving cooling efficiency by the cooling air flow, thereby providing an automotive alternator enabling the temperature of the stator coil and the rectifier to be lowered and also enabling worsening of wind noise to be suppressed.

A front-end air discharge flow rate may be greater than a rear-end air discharge flow rate, further improving cooling efficiency by the cooling air flow, thereby reliably enabling the temperature of the stator coil and the rectifier to be lowered.

According to another aspect of the present invention, there is provided an automotive alternator including:

a rotor fastened to a shaft rotatably supported by a front bracket and a rear bracket, the rotor having a pair of Lundell-type pole cores disposed inside the brackets;

a stator supported by the brackets, the stator being disposed so as to cover an outer circumference of the rotor, the stator comprising:
  a cylindrical stator core in which a plurality of slots having grooves lying in an axial direction are disposed circumferentially so as to open onto an inner circumferential side; and
  a stator coil installed in the stator core so as to constitute a predetermined winding construction;

a pulley fastened to a front end of the shaft; and a rectifier disposed at a rear end of the rotor, wherein
a plurality of front-end and rear-end air intake apertures are disposed in axial end surfaces of the front and rear brackets, respectively;
a plurality of front-end and rear-end air discharge apertures are disposed in radial side surfaces of the front and rear brackets, respectively; and
front-end and rear-end blowing means are disposed at front and rear axial ends of the rotor, respectively,
whereby a front-end ventilation pathway in which a cooling air flow flows through the front-end air intake apertures into the front-end bracket and flows out through the front-end air discharge apertures, a rear-end ventilation pathway in which a cooling air flow flows through the rear-end air intake apertures into the rear-end bracket and flows out through the rear-end air discharge apertures, and a front-to-rear ventilation pathway in which a cooling air flow flows through an inner side of the rotor between the front end and the rear end each is generated by operation of the blowing means,
wherein a capacity of the rear-end blowing means is greater than a capacity of the front-end blowing means, and a front-end air discharge flow rate is greater than a rear-end air discharge flow rate, improving cooling efficiency by the cooling air flow, thereby providing an automotive alternator enabling the temperature of the stator coil and the rectifier to be lowered and also enabling worsening of wind noise to be suppressed.

The front-to-rear ventilation pathway may be blocked, increasing the front-end air discharge flow rate, thereby enabling temperature increases in the stator coil to be further suppressed.

The front-end and rear-end blowing means may be the Lundell-type pole cores or fans, enabling front-end and rear-end ventilation pathways to be formed in which cooling air flows flow axially into the front and rear brackets and are later expelled radially from the front and rear brackets.

The front-end blowing means may be one of the Lundell-type pole cores and the rear-end blowing means may be a fan, enabling costs to be lowered.

The front-end and rear-end blowing means may be fans, each fan comprising:
a generally annular fan base portion;
a plurality of blade base plates extending radially outwards from outer circumferential edge portions of the fan base portion; and
a plurality of blades standing on an outer circumferential edge portion of each of the plurality of blade base plates, enabling blowing capacity to be increased, thereby raising cooling performance.

The rear-end fan may be provided with a greater number of blades than the front-end fan, enabling the capacity of the rear-end fan to be made greater than that of the front-end fan.

A maximum blade height of the rear-end fan may be greater than a maximum blade height of the front-end fan, enabling the capacity of the rear-end fan to be made greater than that of the front-end fan.

The blade base plates of the rear-end fan may be formed into a shape which blocks valley portions between adjacent magnetic poles of the rotor, increasing the capacity of the rear-end fan and lowering the front-to-rear flow rate of the cooling air, thereby enabling cooling performance to be improved.

A shielding plate may be disposed for blocking air gaps formed by the blade base plates of the rear-end fan and valley portions between adjacent magnetic poles of the rotor, increasing the capacity of the rear-end fan and lowering the front-to-rear flow rate of the cooling air, thereby enabling cooling performance to be improved.

The stator coil may be constructed by:
inserting coil segments composed of short conductors formed into a general U shape from a first end of the stator core into slot pairs in which the slots in each pair are a predetermined number of slots apart; and
circumferentially bending and joining together free end portions of the coil segments extending outwards at a second end of the stator core from slots the predetermined number of slots apart so as to constitute the predetermined winding construction,
wherein turn-end coil ends formed by U-shaped turn ends of the coil segments are aligned in rows circumferentially to constitute a turn-end coil end group, and joint-end coil ends formed by the joining of the free end portions of the coil segments are aligned in rows circumferentially to constitute a joint-end coil end group, enabling the stator coil to be constructed simply.

The joint-end coil end group of the stator coil may be disposed at the front end of the stator core, enabling the stator coil to be cooled effectively.

The stator coil may be constructed by linking a plurality of winding sub-portions so as to constitute the predetermined winding construction,
wherein each of the winding sub-portions is constituted by one strand of wire constituted by a large number of straight portions housed inside the slots and a large number of turn portions linking together end portions adjacent straight portions outside the slots, the strand of wire being installed in the stator core by housing the straight portions so as to form different layers relative to a slot depth direction in slots the predetermined number of slots apart, and coil ends formed by the turn portions are aligned in rows circumferentially to constitute front-end and rear-end coil end groups of the stator coil, enabling the number of joints in the stator coil to be significantly reduced, thereby enabling the productivity of the stator to be improved, and eliminating softening of the electrical conductors due to welding, thereby improving the rigidity of the stator and enabling reducing magnetic noise to be reduced.

The foregoing description of the preferred embodiments of the invention has been presented for purposes of illustration and description. It is not intended to be exhaustive or to limit the invention to the precise from disclosed, and modifications and variations are possible in light of the above teachings or may be acquired from practice of the invention. The embodiments ware chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An automotive alternator comprising:
a rotor fastened to a shaft rotatably supported by a front bracket and a rear bracket, said rotor having a pair of Lundell-type pole cores disposed inside said brackets;
a stator supported by said brackets, said stator being disposed so as to cover an outer circumference of said rotor, said stator comprising:

a cylindrical stator core in which a plurality of slots having grooves lying in an axial direction are disposed circumferentially so as to open onto an inner circumferential side; and a stator coil installed in said stator core so as to constitute a predetermined winding construction;

a pulley fastened to a front end of said shaft; and a rectifier disposed at a rear end of said rotor, wherein a plurality of front-end and rear-end air intake apertures are disposed in axial end surfaces of said front and rear brackets, respectively;

a plurality of front-end and rear-end air discharge apertures are disposed in radial side surfaces of said front and rear brackets, respectively; and front-end and rear-end blowing means are disposed at front and rear axial ends of said rotor, respectively, whereby a front-end ventilation pathway in which a cooling air flow flows through said front-end air intake apertures into said front-end bracket and flows out through said front-end air discharge apertures, a rear-end ventilation pathway in which a cooling air flow flows through said rear-end air intake apertures into said rear-end bracket and flows out through said rear-end air discharge apertures, and a front-to-rear ventilation pathway in which a cooling air flow flows through an inner side of said rotor between said front end and said rear end each is generated by operation of said blowing means, wherein a capacity of said rear-end blowing means is greater than a capacity of said front-end blowing means, and a front-end air intake flow rate is greater than a rear-end air intake flow rate.

2. The automotive alternator according to claim 1 wherein a front-end air discharge flow rate is greater than a rear-end air discharge flow rate.

3. The automotive alternator according to claim 1 wherein said front-to-rear ventilation pathway is blocked.

4. The automotive alternator according to claim 1 wherein said front-end and rear-end blowing means are said Lundell-type pole cores or fans.

5. The automotive alternator according to claim 1 wherein:

said front-end blowing means is one of said Lundell-type pole cores; and said rear-end blowing means is a fan.

6. The automotive alternator according to claim 1 wherein said front-end and rear-end blowing means are fans, each fan comprising:

a generally annular fan base portion;

a plurality of blade base plates extending radially outwards from outer circumferential edge portions of said fan base portion; and a plurality of blades standing on an outer circumferential edge portion of each of said plurality of blade base plates.

7. The automotive alternator according to claim 6 wherein said rear-end fan is provided with a greater number of blades than said front-end fan.

8. The automotive alternator according to claim 6 wherein a maximum blade height of said rear-end fan is greater than a maximum blade height of said front-end fan.

9. The automotive alternator according to claim 6 wherein said blade base plates of said rear-end fan are formed into a shape which blocks valley portions between adjacent magnetic poles of said rotor.

10. The automotive alternator according to claim 6 wherein a shielding plate is disposed for blocking air gaps formed by said blade base plates of said rear-end fan and valley portions between adjacent magnetic poles of said rotor.

11. The automotive alternator according to claim 1 wherein said stator coil is constructed by:

inserting coil segments composed of short conductors formed into a general U shape from a first end of said stator core into slot pairs in which said slots in each pair are a predetermined number of slots apart; and circumferentially bending and joining together free end portions of said coil segments extending outwards at a second end of said stator core from slots the predetermined number of slots apart so as to constitute the predetermined winding construction, wherein turn-end coil ends formed by U-shaped turn ends of said coil segments are aligned in rows circumferentially to constitute a turn-end coil end group, and joint-end coil ends formed by said joining of said free end portions of said coil segments are aligned in rows circumferentially to constitute a joint-end coil end group.

12. The automotive alternator according to claim 11 wherein said joint-end coil end group of said stator coil is disposed at said front end of said stator core.

13. The automotive alternator according to claim 1 wherein said stator coil is constructed by linking a plurality of winding sub-portions so as to constitute the predetermined winding construction, wherein each of said winding sub-portions is constituted by one strand of wire constituted by a large number of straight portions housed inside said slots and a large number of turn portions linking together end portions adjacent straight portions outside said slots, said strand of wire being installed in said stator core by housing said straight portions so as to form different layers relative to a slot depth direction in slots the predetermined number of slots apart, and coil ends formed by said turn portions are aligned in rows circumferentially to constitute front-end and rear-end coil end groups of said stator coil.

14. An automotive alternator comprising:

a rotor fastened to a shaft rotatably supported by a front bracket and a rear bracket, said rotor having a pair of Lundell-type pole cores disposed inside said brackets;

a stator supported by said brackets, said stator being disposed so as to cover an outer circumference of said rotor, said stator comprising:

a cylindrical stator core in which a plurality of slots having grooves lying in an axial direction are disposed circumferentially so as to open onto an inner circumferential side; and a stator coil installed in said stator core so as to constitute a predetermined winding construction;

a pulley fastened to a front end of said shaft; and a rectifier disposed at a rear end of said rotor, wherein a plurality of front-end and rear-end air intake apertures are disposed in axial end surfaces of said front and rear brackets, respectively;

a plurality of front-end and rear-end air discharge apertures are disposed in radial side surfaces of said front and rear brackets, respectively; and front-end and rear-end blowing means are disposed at front and rear axial ends of said rotor, respectively, whereby a front-end ventilation pathway in which a cooling air flow flows through said front-end air intake apertures into said front-end bracket and flows out through said front-end air discharge apertures, a rear-end ventilation pathway in which a cooling air flow flows through said rear-end air intake apertures into said rear-end bracket and flows out through said rear-end air discharge apertures, and a front-to-rear ventilation pathway in which a cooling air flow flows through an inner side of said rotor between said front end and said rear end each is generated by operation of said blowing means, wherein a capacity of said rear-end blowing means is greater than a capacity of said front-end blowing means, and a front-end air discharge flow rate is greater than a rear-end air discharge flow rate.

15. The automotive alternator according to claim 14 wherein said front-end and rear-end blowing means are fans, each fan comprising:

a generally annular fan base portion;

a plurality of blade base plates extending radially outwards from outer circumferential edge portions of said fan base portion; and a plurality of blades standing on an outer circumferential edge portion of each of said plurality of blade base plates.

16. The automotive alternator according to claim 15 wherein said rear-end fan is provided with a greater number of blades than said front-end fan.

17. The automotive alternator according to claim 15 wherein a maximum blade height of said rear-end fan is greater than a maximum blade height of said front-end fan.

18. The automotive alternator according to claim 15 wherein said blade base plates of said rear-end fan are formed into a shape which blocks valley portions between adjacent magnetic poles of said rotor.

19. The automotive alternator according to claim 15 wherein a shielding plate is disposed for blocking air gaps formed by said blade base plates of said rear-end fan and valley portions between adjacent magnetic poles of said rotor.

* * * * *